US012200492B2

(12) United States Patent
Sasi et al.

(10) Patent No.: US 12,200,492 B2
(45) Date of Patent: Jan. 14, 2025

(54) METHOD AND SYSTEM FOR DETECTING CYBER-ATTACKS USING NETWORK ANALYTICS

(71) Applicant: Samsung Electronics Co., Ltd., Suwon-si (KR)

(72) Inventors: Nivedya Parambath Sasi, Bangalore (IN); Rohini Rajendran, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 17/672,136

(22) Filed: Feb. 15, 2022

(65) Prior Publication Data

US 2022/0264307 A1 Aug. 18, 2022

(30) Foreign Application Priority Data

Feb. 16, 2021 (IN) .............................. 202141006536
Jan. 24, 2022 (IN) .............................. 2021 41006536

(51) Int. Cl.
*H04L 9/40* (2022.01)
*H04W 12/121* (2021.01)

(52) U.S. Cl.
CPC ....... *H04W 12/121* (2021.01); *H04L 63/1458* (2013.01); *H04L 63/1466* (2013.01)

(58) Field of Classification Search
CPC ............. H04W 12/121; H04L 63/1458; H04L 63/1466
See application file for complete search history.

(56) References Cited

U.S. PATENT DOCUMENTS 11,310,731 B1 * 4/2022 Feder .................. H04W 36/32
2019/0380037 A1 * 12/2019 Lifshitz ............... H04L 41/0893
(Continued)

FOREIGN PATENT DOCUMENTS

| EP | 3952423 A1 | 2/2022 |
| WO | 2020/199824 A1 | 10/2020 |

OTHER PUBLICATIONS

Lenovo et al.; Analytics for MitM Attack Detection; 3GPP TSG-SA3 Meeting #102e; S3-210419; S3-210419; e-meeting, Jan. 18-29, 2021; Jan. 11, 2021.
Lenovo et al.; KI#16, Sol#31, Additional clarifications; 3GPP TSG-SA WG2 Meeting #142e; S2-2009388; emeeting, Nov. 16-20, 2020, Nov. 23, 2020.
(Continued)

*Primary Examiner* — Stephen T Gundry
(74) *Attorney, Agent, or Firm* — Jefferson IP Law, LLP

(57) ABSTRACT

The disclosure relates to 5G or 6G communication systems for supporting higher data transmission rates.
A method of detecting cyber-attacks using network analytics in a user equipment (UE) is provided. The method includes receiving, by a network data analytics function (NWDAF), a request for sharing analytics information associated with the UE from a consumer network function (NF), requesting the analytics information associated with the UE and causing the cyber-attack to at least one 5th generation core (5GC) network entity, receiving the analytics information associated with the UE and causing the cyber-attack from the at least one 5GC network entity, comparing an expected behavior of the UE with an actual behavior based on the analytics information provided by the at least one 5GC network entity, deriving analytics associated with the cyber-attack based on the analytics information and the comparison, and sending the analytics associated with the UE to the consumer NF.

20 Claims, 10 Drawing Sheets

(56) References Cited

U.S. PATENT DOCUMENTS

| | | | | |
|---|---|---|---|---|
| 2020/0252813 A1* | 8/2020 | Li | ............... | H04W 24/08 |
| 2021/0152982 A1* | 5/2021 | Agarwal | ............ | H04W 68/005 |
| 2023/0056442 A1* | 2/2023 | Ly | ............... | H04W 24/08 |
| 2023/0068189 A1* | 3/2023 | Xu | ............... | H04W 76/10 |
| 2023/0413360 A1* | 12/2023 | Velev | ............ | H04W 48/18 |
| 2024/0129209 A1* | 4/2024 | Karampatsis | ...... | H04W 24/08 |
| 2024/0129793 A1* | 4/2024 | Talebi Fard | ...... | H04W 28/0289 |
| 2024/0129794 A1* | 4/2024 | Talebi Fard | ........ | H04L 47/10 |
| 2024/0129992 A1* | 4/2024 | Qiao | ............ | H04W 76/20 |
| 2024/0137282 A1* | 4/2024 | Onno | ............ | H04L 41/5058 |
| 2024/0137746 A1* | 4/2024 | Sasi | ............ | H04L 41/082 |
| 2024/0147189 A1* | 5/2024 | Guduru | ............ | H04W 4/02 |
| 2024/0147406 A1* | 5/2024 | Suh | ............... | H04W 60/04 |
| 2024/0155342 A1* | 5/2024 | Faccin | ............ | H04W 12/082 |
| 2024/0155393 A1* | 5/2024 | Han | ............ | H04W 24/10 |
| 2024/0179647 A1* | 5/2024 | Qiao | ............ | H04W 56/001 |

OTHER PUBLICATIONS

Spirent Comm. et al.; KI #9, Solution Completion and Procedures: Dispersion Analytic Output Provided by NWDAF; 3GPP SA WG2 Meeting #141E; S2-2008055; online, Oct. 12-23, 2020; Oct. 26, 2020.

Ericsson et al.; KI#10, sol#68—Update to remove errors; SA WG2 Meeting #142E; S2-2009375; e-meeting, Nov. 16-20, 2020; Nov. 22, 2020.

International Search Report with Written Opinion dated May 12, 2022; International Appln. No. PCT/KR2022/002235.

5G; Architecture enhancements for 5G System (5GS) to support network data analytics services (3GPP TS 23.288 version 16.5.0 Release 16) XP014389437, Oct. 27, 2020.

European Search report dated Jun. 24, 2024, issued in European Application No. 22756469.7-1218.

* cited by examiner

| Exception ID | UE behaviour parameters to provide | NF for data collection |
|---|---|---|
| Unexpected UE location | Expected UE moving trajectory<br>Stationary indication | AMF |
| Unexpected long-live/large rate flows | Periodic time<br>Scheduled communication time<br>Communication duration time | SMF |
| Unexpected wakeup | Periodic time<br>Communication duration time<br>Scheduled communication time | SMF |
| Suspicion of DDoS attack | Periodic time<br>Communication duration time<br>Scheduled communication time<br>Scheduled communication type<br>Traffic profile | SMF |
| Too frequent service access | Periodic time | SMF |
| Unexpected radio link failures | Expected UE moving trajectory | AMF |
| Ping-ponging across neighbouring cells | Expected UE moving trajectory<br>Stationary indication | AMF |

FIG.1D
(RELATED ART)

METHOD AND SYSTEM FOR DETECTING CYBER-ATTACKS USING NETWORK ANALYTICS

CROSS-REFERENCE TO RELATED APPLICATION (S)

This application is based on and claims priority under 35 U.S.C. § 119(a) of an Indian provisional patent application number 202141006536, filed on Feb. 16, 2021, in the Indian Intellectual Property Office, and of an Indian Complete patent application number 202141006536, filed on Jan. 24, 2022, in the Indian Intellectual Property Office, the disclosure of each of which is incorporated by reference herein in its entirety.

BACKGROUND

1. Field

The disclosure relates to wireless communication systems. More particularly, the disclosure relates to a method and a system for detecting cyber-attacks using network analytics.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In general, a network data analytics function (NWDAF) is part of architecture specified in TS 23.501 (FIG. 1A) and uses mechanisms and interfaces specified for a $5^{th}$ generation core (5GC) network in TS 23.501 and operations, administration and maintenance (OAM) services.

FIG. 1A is an architecture for Nnwdaf_EventSubscription Service according to the related art.

Referring to FIG. 1A, the NWDAF interacts with different entities in the 5GC network for different purposes, such as data collection based on subscription to events provided by an authentication management function (AMF), a session management function (SMF), a policy control function (PCF), a unified data management (UDM), an application function (AF) and the OAM, retrieval of information from data repositories (e.g., user data repository (UDR) via the UDM for subscriber-related information), retrieval of information (e.g., from a network repository functions (NRFs) for network function (NF)-related information) and on demand provision of analytics to consumers.

FIG. 1B is an architecture for data collection from any $5^{th}$ generation core network function (5GC NF) according to the related art. FIG. 1C is an architecture for network data analytics exposure according to the related art.

Referring to FIGS. 1B and 1C, a Nnf (A) interface is defined for NWDAFs to request subscription to data delivery for a particular context, to cancel subscription to data delivery and to request a specific report of data for a particular context with any NF.

A Nnwdaf interface is defined for 5GC NFs, to request subscription to network analytics delivery for a particular context, to cancel subscription to network analytics delivery and to request a specific report of network analytics for a particular context.

The NWDAF provides analytics information to the 5GC NFs, and the OAM as defined in clause 7 of TS 23.288. The analytics information are either statistical information of the past events, or predictive information. Different NWDAF instances may be present in the 5GC network, with possible specializations per type of analytics. The capabilities of a NWDAF instance are described in the NWDAF profile stored in the NRF.

According to use case 5 of TR 23.700-91, cyber-attacks can be efficiently detected by monitoring events and data packets in a user equipment (UE) and in the 5GC network with the support of the NWDAF and machine-learning algorithms. The UE and NWDAF collaborate with each other to detect the attacks that may occur in a UE, a radio access network (RAN) or the 5GC network. Relevant parameters are to be collected from UEs for deriving the analytics in order to detect the cyber-attack. The cyber-attacks may be a denial of service (DoS) attack, a man in the middle (MitM) attack or an impersonation.

Based on the derived analytics using collected data from the UE, the NWDAF can provide the attack detection alerts to the OAM and the 5GC NFs that have subscribed to them so that they could take proper action.

There are two types DoS attacks as follows: DoS attack on the UE: which attempts to hinder the UE's access to the 5GC network, and DoS attack on the 5GC network, which attempts to hinder the 5GC networks ability to provide services to the subscribed UEs. The DoS can be mounted by a number of methods, including but are not limited to, manipulation of chosen fields in a master information blocks (MIB)/system information blocks (SIBs), an arbitrary bit flipping of signed MIB/SIBs, a replay of signed MIB/SIBs, a broadcast MIB/SIBs with invalid signatures, and a manipulation of a timing information in the UE or a gNodeB (gNBs). Since the MIB/SIBs are digitally signed, a DoS based on manipulation of chosen fields in MIB/SIBs (e.g., a barred cell) will be detected and prevented.

The MitM can be performed in various ways, such as, with a false base station acting as a relay node towards the legitimate gNB and a genuine UE connects with a fake gNB or in a different attack scenario where the UE can be malicious and the false base station is connected to a malicious UE either in the same or a different public land mobile network (PLMN).

FIG. 1D illustrates expected user equipment (UE) behavior parameters per exception identifier (ID) according to the related art.

Referring to FIG. 1D, according to table 6.7.5.1-1 of TS 23.288, a mapping between each exception ID and UE behavior parameters are as illustrated. When the NWDAF detects the UEs which deviate from the expected UE behavior, for example unexpected UE location, abnormal traffic pattern, wrong destination addresses or the like, the NWDAF notifies the result of the analytics to the consumer as specified in clause 6.7.5.3.

According to TS 23.502, when subscribing to event reporting, the NF consumer(s) provide: one or multiple event ID(s), event filter information, event reporting information. The event ID identifies a type of event being subscribed to (e.g., PDU session release, UE mobility out of an area of interest, or the like). The event filter information provides event parameter types and event parameter value(s) to be matched against, in order to meet the condition for notifying the subscribed event ID e.g., the event parameter type could be "Area of interest" and the event parameter value list could be a list of TAs. The Event Filter depends on the event ID. The event filter information is provided per event ID(s) being subscribed to: within a subscription different event ID(s) may be associated with different event filter information. The event reporting information described in the Table 4.15.1-1 below. Within a subscription all event ID(s) are associated with a unique event reporting information.

A target of event reporting may indicate a specific UE or PDU session, a group of UE(s) or any UE (i.e., all UEs), within a subscription all event ID (s) are associated with the same target of event reporting (possibly corresponding to multiple UE or multiple PDU Sessions). A notification target address (+ Notification Correlation ID) allowing the event receiving NF to correlate notifications received from the event provider with this subscription. A subscription is associated with a unique notification target address (+ Notification Correlation ID). In the case where the NF consumer subscribes to the NF producer on behalf of other NF, the NF consumer includes the notification target address (+ Notification Correlation ID) of other NF for the Event ID which is to be notified to other NF directly, and the notification target address (+ Notification Correlation ID) of itself for the subscription change related event notification. Each notification target address (+ Notification Correlation ID) is associated with related (set of) Event ID(s).

An expiry time represents the time up to which the subscription is desired to be kept as active. The NF service consumer may suggest an expiry time and provide to the NF service producer. Based on the operator's policy, the NF service producer decides whether the subscription can be expired. If the subscription can be expired, the NF service producer determines the expiry time and provide it in the response to the NF service consumer. If the event subscription is about to expire based on the received expiry time and the NF service consumer wants to keep receiving notifications, the NF service consumer update the subscription with the NF service producer in order to extend the expiry time. Once the expiry time associated with the subscription is reached, the subscription becomes invalid at the NF service producer. If the NF service consumer wants to keep receiving notifications, it creates a new subscription with the NF service producer.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a system for detecting cyber-attack using network analytics.

Another aspect of the disclosure is to provide methods to obtain user equipment (UE) related data (i.e., different parameters) for the deriving the network analytics for denial of service (DoS) attack and a man in the middle (MitM) attack.

Another aspect of the disclosure is to provide the corresponding mitigation techniques based on the derived analytics provided by the network data analytics function (NWDAF).

Additional aspects will be set forth in part in the description which follows and, in part, will be apparent from the description, or may be learned by practice of the presented embodiments.

In accordance with an aspect of the disclosure, a method and system for detection of cyber-attacks (e.g., a DoS attack, a MitM attack, or the like) using network analytics is provided. The method includes different mechanisms to obtain UE related data (i.e., different parameters) for the analytics derivation by the NWDAF and the corresponding mitigation techniques based on the derived analytics.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1D illustrates expected user equipment (UE) behavior parameters per exception identifier (ID) according to the related art;

The same reference numerals are used to represent the same elements throughout the drawings.

DETAILED DESCRIPTION

Figure 1A:
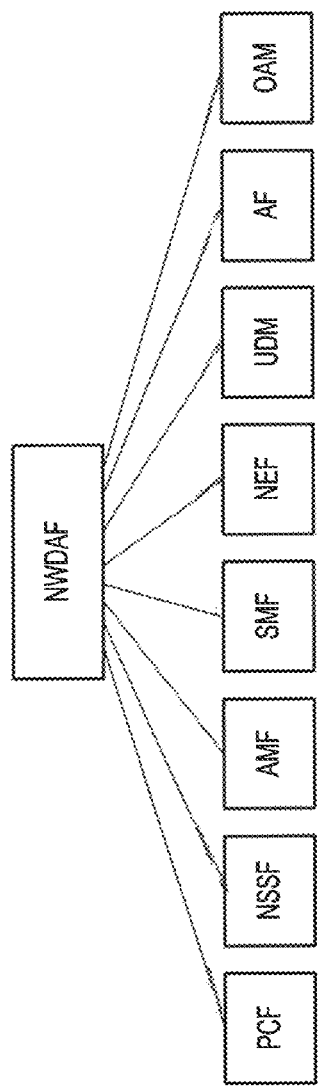
FIG. 1A is an architecture for Nnwdaf_EventSubscription Service according to the related art.
Figure 1B:
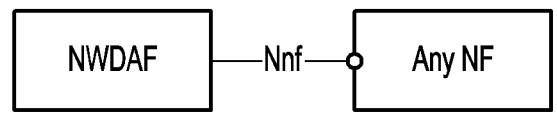
FIG. 1B is an architecture for data collection from any $5^{th}$ generation core network function (5GC NF) according to the related art.
Figure 1C:
FIG. 1C is an architecture for network data analytics exposure according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the disclosure described herein are not necessarily mutually exclusive, as some embodiments maybe combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards, and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments of the disclosure herein provide a method and a system for detection of cyber-attacks (e.g., a DoS attack, a MitM attack, or the like) using network analytics. The proposed method includes different mechanisms to obtain UE related data (i.e., different parameters) for the analytics derivation by the NWDAF and the corresponding mitigation techniques based on the derived analytics.

Referring now to the drawings and more particularly to FIGS. 2 through 7, where similar reference characters denote corresponding features consistently throughout the figures, there are shown preferred embodiments of the disclosure.

Figure 2:
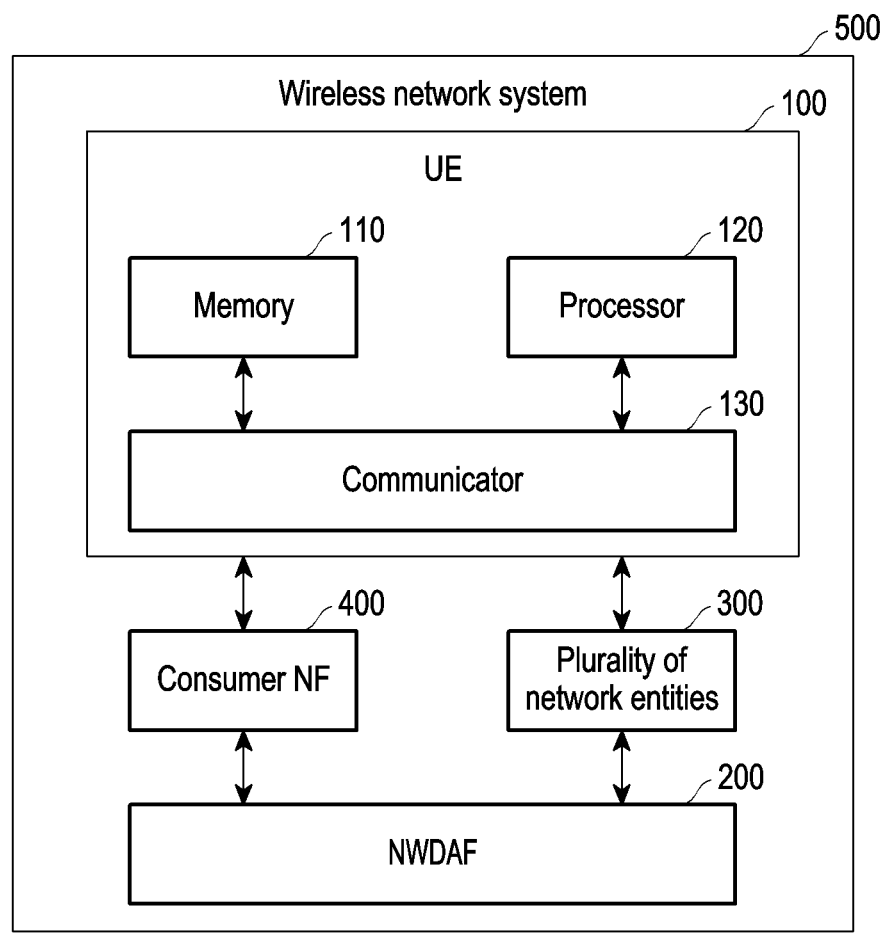
FIG. 2 is schematic diagram illustrating a UE communicating with a network data analytics function (NWDAF) through a plurality of network entities for detecting cyber-attacks using network analytics according to an embodiment of the disclosure.

FIG. 2 is schematic diagram illustrating a wireless network system comprising a UE communicating with a NWDAF through a plurality of network entities and a consumer NF for detecting cyber-attacks using network analytics according to an embodiment of the disclosure.

Referring to FIG. 2, a UE (100) is in a 5GC network (wireless network) (1000) and detects the cyber-attack using a NWDAF (200) and a plurality of network entities (300). In an embodiment of the disclosure, the UE (100) interacts with a consumer NF (400), wherein the consumer NF (400) is an entity from the plurality of network entities (300).

The plurality of network entities are, for example, but not limited to an AUSF (300A), an AMF (300B), a SMF (300C), a PCF (300D), a UDM (300E), an AF (300F), and an OAM (300G).

Examples of the UE (100) include, but are not limited to a smartphone, a tablet computer, a personal digital assistance (PDA), an Internet of things (IoT) device, a wearable device, or the like.

In an embodiment of the disclosure, the UE (100) includes a memory (110), a processor (120), and a communicator (130).

In an embodiment of the disclosure, the memory (110) is configured to store information associated with the cyber-attack. The memory (110) stores instructions to be executed by the processor (120). The memory (110) may include non-volatile storage elements. Examples of such non-volatile storage elements may include magnetic hard disks, optical discs, floppy disks, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) may be configured to store larger amounts of information than the memory. In certain examples, a non-transitory storage medium may store data that can, over time, change (e.g., in a random access memory (RAM) or cache). The memory (110) maybe an internal storage unit or it may be an external storage unit of the UE (100), a cloud storage, or any other type of external storage.

The processor (120) communicates with the memory (110), and the communicator (130). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit, such as a graphics processing unit (GPU), a visual processing unit (VPU), and/or an artificial intelligence (AI) dedicated processor, such as a neural processing unit (NPU).

The communicator (130) is configured for communicating internally between internal hardware components and with external devices (e.g., an AAnF server, UDM, a server, or the like) via one or more networks (e.g., radio technology). The communicator (130) includes an electronic circuit specific to a standard that enables wired or wireless communication.

In an embodiment of the disclosure, each of the NWDAF (200), the consumer NF (400), and the plurality of network entities may include a memory, a processor, and a communicator, respectively.

In an embodiment of the disclosure, the consumer NF (400) detects a continuous failure of a non-access-stratum (NAS) procedure of the UE (100) with the wireless 5GC network. Further, the consumer NF (400) determines a possibility of the cyber-attack on the UE (100) based on the detected continuous failure of the NAS procedure.

In an embodiment of the disclosure, the NAS procedure is one of an authentication procedure of the UE (100), a registration procedure of the UE (100), a service request procedure, a packet data unit (PDU) session establishment procedure for the UE (100), and a UE configuration update procedure.

Further, based on the possibility, the consumer NF (400) sends a request to the NWDAF (200) for sharing analytics information associated with the UE (100). Further, the NWDAF (200) request the analytics information associated with the UE (100) to a network entity from the plurality of network entities (300).

After receiving the request, the network entity from the plurality of network entities (300) sends an event report to the NWDAF (200) as the analytics information of the UE (100).

The NWDAF (200) then compares an expected behavior of the UE (100) with an actual behavior based on the analytics information provided by the network entity from the plurality of network entities (300). Based on the comparison, the NWDAF (200) derives analytic information about the cyber-attack on the UE (100) and sends to the consumer NF (400).

Thus, the cyber-attack on the UE (100) is detected using the above explained procedure.

Figure 3:
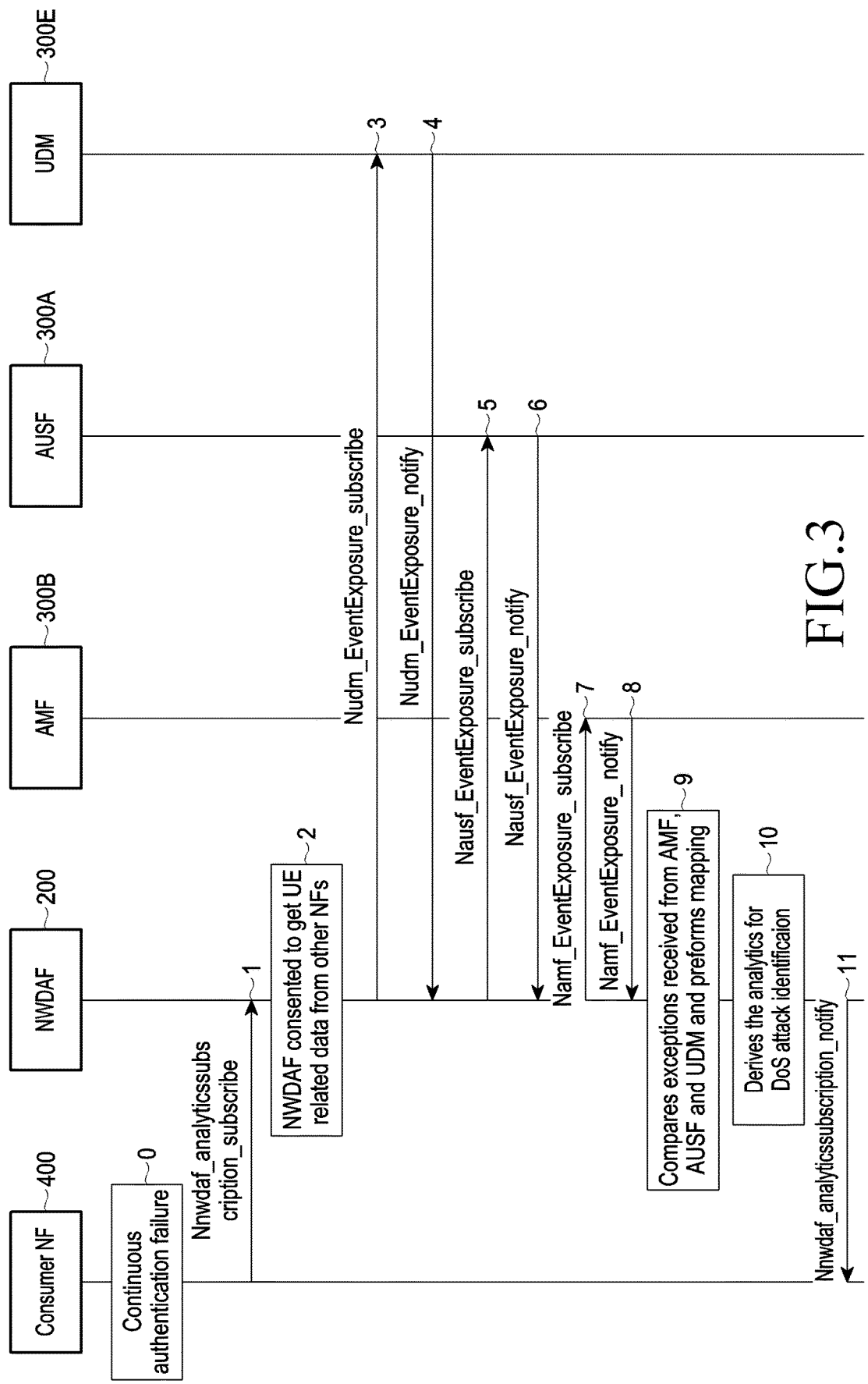
FIG. 3 is a signaling diagram illustrating NWDAF checks abnormality in authentication failure denial of service (DoS) attack (DoS attack) according to an embodiment of the disclosure.

FIG. 3 is a signaling diagram illustrating checking an abnormality in an authentication failure (DoS attack) of a UE by a NWDAF according to an embodiment of the disclosure.

Referring to FIG. 3, in an embodiment of the disclosure, upon request of the consumer NF (400), the NWDAF (200) collects and analyzes a behavioral information of the UE (100) and/or expected behavioral parameters of the UE (100) from the plurality of network entities (300) depending on an exception IDs.

3GPP TR 23.700-91 has identified the use case of the NWDAF (200) detecting cyber-attacks by monitoring events and data packets in the UE (100) and the 5GC network. To achieve cyber-attacks detection, the NWDAF (200) collaborates with the UE (100) and any other NFs to collect related data as inputs, afterwards providing alerts of anomaly events as outputs to OAM and other NFs which have subscribed to them so that they could take proper actions.

Suspicion of DoS attack: 5G communication has high performance requirements for system capacity and data rate, improved capacity and higher data rate may lead to much higher processing capability cost for network entities, which may make some network entities (e.g., RAN, core network entities) to suffer from DoS attack. The NWDAF (200) may also enable the detection of DoS attacks. The DoS attacks are possible on radio access network (RAN) nodes, AF and the network entities like AMF, SMF, UDM, or the like.

Suspicion of MitM attack: MitM attacks or fraudulent relay nodes may modify or change the messages between the UE (100) and the RAN, resulting in failures of higher layer protocols, such as NAS or the primary authentication. The NWDAF (200) may detect the MitM attacks.

The UE (100) and the NWDAF (200) collaborate with each other to detect the cyber-attacks that may occur in the UE (100), the RAN or the 5GC network. The relevant parameters to be collected from the UE (100) are to be provided. Therefore, it needs to be clear that what all parameters helps in performing cyber-attack detection which are collected from the UE (100) and/or from the 5GC network and/or from the OAM. Attack detection alerts could be provided to OAM and the NFs that have subscribed to them so that they could take proper action.

The proposed solution discloses that the NWDAF (200) can collect information from different NFs in order to provide the relevant information to the requesting or subscribed consumer NF (400) for the network analytics.

Since the DoS attack or the MitM attack may also lead to dropped or changed packets between the UE (100) and a legitimate gNB, the abnormal and/or illegal failure indication, various categories of failure cause and timeouts with respect to the NAS messages are relevant for the analytics. Further information from the UDM and AUSF about the authentication status and the registration status in the network and the performance management from OAM can give additional information as explained below.

An authentication failure: the NWDAF (200) checks the reason for continuous authentication failure (DoS attack): in an embodiment of the disclosure, the NWDAF (200) checks for the continuous authentication failure, by comparing the exception parameters received from UDM, AUSF and the AMF.

Failure Scenarios during:

Case 1: Initial registration: during failure case (initial registration), the AMF is not aware of the failed SUPI. Only the SUCI information is available to AMF i.e., AMF performs the identity requests and obtains the SUCI.

Case 2: the UE is in connected mode and Authentication failure occurs. If a UE is in connected mode and authentication failure occurs, then re-authentication procedure can be initiated from the UE side. In such cases, AMF can map on which N1 interface the authentication has failed for that particular UE and AMF checks on the SUPI corresponding to the SUCI. AMF can report the failed SUPI information to the NWDAF in order to perform the analytics for DoS attack.

The subscription identifier de-concealing function (SIDF) service offered by the UDM in the home network of the subscriber responsible for de-concealing the SUPI from the SUCI. If the SUCI is concealed to a valid ID in the network, the UDM can provide the details of the failed SUPI, if there is an authentication failure.

In an embodiment of the disclosure, in addition to MitM and DoS attack, the NWDAF should categorize the genuine authentication failure and send error cause. i.e., "error" due to radio conditions (e.g., a radio link failure-DRNS internal failure, congestion, lost radio interface synchronization due to bas radio condition, loss of UL synchronization.

Inputs from UDM, AUSF and AMF to NWDAF is provided in Table 1.

TABLE 1

| Information | Description |
| --- | --- |
| UE ID | SUPI (UE ID in which the exception occurred) |
| > DNN | DNN for the PDU Session that SMF collects Data |
| > S-NSSAI | S-NSSAI for the PDU Session that SMF collects Data |
| > Start time of data collection | Start time of data collection |
| > End time of data collection | End time of data collection |
| >> Timestamp | A time stamp when AMF receives NAS message from UE |
| >> Timestamp | A time stamp when AMF sends NAS message to UE |
| >> Provided backoff timer | A value of backoff timer provided to UE |
| >>AUSF ID | AUSF which involved in authentication procedure |
| >>AMF ID | AMF in which mobility and tracking information that NWDAF collects data |
| >> TAI | Tracking Area selected by the UE |
| >>CAG ID | (Optional) UE selected CAG Cell |
| >>PCI | PCI in which the exception occurred |
| >>Downlink Frequency | Frequency range at which the exception occurred |
| >> Exception ID | Suspicion of Dos Attack |
| >>Exception Category | Authentication failure |
| > SM NAS request from UE (1max) (if applicable) | Information on SM NAS messages that SMF receives from UE for PDU Session |
| >> Type of SM NAS request (if applicable) | A type of SM NAS message transmitted by UE (e.g., PDU session establishment request, PDU session modification request, or the like) |
| >>RAN UE ID | Uniquely identify the UE over NG interface |
| >>VPLMN ID | UE selected serving network ID |

In an embodiment of the disclosure, the UDM, AUSF and AMF includes at least one of the parameters (in the table) as the input for analytics derivation.

Output from NWDAF to Consumer NF is provided in Table 2.

TABLE 2

| Information | Description |
| --- | --- |
| > DNN (NOTE) | DNN that DoS is applied |
| > S-NSSAI (NOTE) | S-NSSAI that DoS is applied |
| > List of UEs classified based on experience level of DoS | One or more than one of the following lists (SUPI is used to identify UE) |

TABLE 2-continued

| Information | Description |
| --- | --- |
| >> Exception ID | Suspicion of Dos Attack |
| >>Exception category | Indication for Authentication failure |
| >> Analytics ID | To indicate when the analytics are derived and based on what event ID |

Services Provided by NWDAF:

Service operation name: Nudm_EventExposure_Subscribe.

Description: The NWDAF requests the UDM to provide the inputs for analytics derivation. Input, Required: Event ID, Event filter, Any UE or SUPI, internal group identifier.

Input, Optional: None. Output, Required: Event report (AUSF ID, AMF ID, SUPI), Exception category.

Output, Optional: None.

Service operation name: Nausf_EventExposure_Subscribe.

Description: The NWDAF requests the AUSF to provide the inputs for analytics derivation. Input, Required: Event ID, Event filter, Any UE or SUPI, internal group identifier.

Input, Optional: None. Output, Required: Event report (AUSF ID, AMF ID, SUPI), Exception category.

Output, Optional: None.

Service operation name: Namf_EventExposure_Subscribe.

Description: The NWDAF requests the AMF to provide the inputs for analytics derivation. Input, Required: Event ID, Event filter, Any UE or SUPI, internal group identifier.

Input, Optional: None.

Output, Required: Event report (AMF ID, AUSF ID, RI, SUCI, TAI, CAG (closed access group cells) ID), Exception category. Output, Optional: CAG ID.

The operations of the sequence diagram in FIG. 3 is as explained below.

Operation 0: At operation 0, continuous authentication failure of the UE (100) is detected.

Operation 1: The consumer NF (400) (e.g., SMF, PCF, AMF, or the like) requests to/subscribes to the NWDAF (200) using Nnwdaf_AnalyticsSubscription_Subscribe/nwdaf_AnalyticsInfo_Request (Analytics ID set to "DoS attack identification", Target of Analytics Reporting=Internal-Group-Identifier, any UE or SUPI, Analytics Filter Information), for obtaining analytics information on "DoS attack Identification".

In an embodiment of the disclosure, the derived Analytics are provided by NWDAF (200) if the consumer NF (400) wants to take the analytics information into account when applying the DoS detection and/or DoS mitigation.

In another embodiment of the disclosure, the consumer NF (400) may subscribe to/request signaling failure notification/response from the NWDAF (200) for a group of UEs, any UE or a specific UE. The Analytics ID indicates the NWDAF (200) to identify misused or hijacked UEs through signaling failure analytic.

Operation 2: The NWDAF (200) is consented to get the UE (100) related data from the other network functions.

Operation 3: The NWDAF (200) sends a subscription request to the UDM (300E) using Nudm_EventExposure_Subscribe (Event ID(s), Event Filter(s), Internal-Group-Identifier, any UE or SUPI) asking the analytics information.

Operation 4: The UDM (300E) sends the event reports to the NWDAF (200) over Nudm_EventExposure_Notify based on requirements contained in the subscription request received from the NWDAF (200). The event report shared by the UDM (300E) includes at least one of the following parameters, UE characteristics (e.g., a UE ID, an internal group Identifier, a list of authorized UEs under TA requested, or the like) and all other parameters defined in TS 23.502 clause 4.15.1. The event reports additionally include the AUSF ID and SUPI, in which the continuous authentication failure occurs. Along with the event report, the UDM (300E) provides the exception category="Authentication failure" to the NWDAF (200) based on the analysis.

Operation 5: NWDAF (200) to AUSF 300A: Nausf_EventExposure_Subscribe (Event ID(s), Event Filter(s), Internal-Group-Identifier, any UE or SUPI). The NWDAF (200) sends a subscription requests to the related AUSF (s) if it has not subscribed to such data.

Operation 6: The AUSF (300A) sends event reports to the NWDAF (200) over Nausf_EventExposure_Notify based on the report requirements contained in the subscription request received from the NWDAF (200).

If requested by the NWDAF (200) via Event Filter(s), the AMF (300B) checks whether the UE's (100) behavior matches an expected UE behavioral information. In an embodiment of the disclosure, the AUSF (300A) sends the event reports to the NWDAF (200) only when it detects that the UE's (100) behavior is deviated from the expected UE behavior.

In an embodiment of the disclosure, the expected UE behavior is offered to the AUSF (300A) as a part of the authentication procedure. The event report includes at least one of the following parameters. The UE characteristics (e.g., a UE ID, an internal group Identifier, a list of authorized UEs under TA requested, or the like) and all other parameters defined in TS 23.502 clause 4.15.1. Along with the event report AUSF provides the exception category="Authentication failure" to the NWDAF (200) based on the analysis.

In an embodiment of the disclosure, the AUSF (300A) provides the AMF ID with a trust to the NWDAF (200).

In another embodiment of the disclosure, the UDM (300E) provides the trusted AMF ID to the NWDAF (200).

Operation 7: NWDAF (200) to AMF (300B): Namf_EventExposure_Subscribe (Event ID(s), Event Filter(s), Internal-Group-Identifier, any UE or SUPI).

The NWDAF (200) sends a subscription requests to the related AMF (300B) (s) if it has not subscribed to such data.

Operation 8: The AMF (300B) sends the event reports to the NWDAF (200) over Nausf_EventExposure_Notify based on a report requirements contained in the subscription request received from the NWDAF (200).

In an embodiment of the disclosure, if the NWDAF (200) request the event report via event Filter(s), then the AMF (300B) checks whether the UE's (100) behavior matches its expected UE behavioral information. In this case, the AMF (300B) sends the event reports to the NWDAF (200) only when it detects that the UE's (100) behavior deviated from its expected UE behavior.

In an embodiment of the disclosure, the expected UE behavior is offered to the AMF (300B) as a part of access and mobility data subscription.

The event report includes at least one of the following parameters: UE characteristics (e.g., a UE ID, an internal group Identifier, a list of authorized UEs under TA requested, or the like) and all other parameters defined in TS 23.502 clause 4.15.1.

In another embodiment of the disclosure, the AMF (300B) further provides the parameters, such as SUCI, a tracking area identity (TAI), a CAG ID (if applicable), a physical cell Id (PCI), a downlink (DL) frequency, an AMF ID, an AUSF ID, RI and other possible parameters, or like.

In an embodiment of the disclosure, the AMF (300B) obtains the PCI and DL frequency from the RAN and send it to the NWDAF (200) for further analytic derivation.

Operations 9-10: Upon receiving the notify message from the UDM (300E), the AUSF (300A) and the AMF (300B), the NWDAF (200) compares the exception parameters received from the UDM (300E), the AUSF (300A) and the AMF (300B).

In an embodiment of the disclosure, data analytics may be performed on TAI, AMF ID, PCI, CAG ID based on the received data.

(Optional) In an embodiment of the disclosure, the NWDAF (200) verifies the credibility of the AMF (300B) or other NFs with the UDM (300E).

The NWDAF (200) analyses in a particular AMF ID, the total number of failures occurs and for a particular TAI, the number of failures occurred (i.e., miss operations and/or miss implementation of the network. NWDAF also map the received SUCI from AMF with the SUPI received from the AUSF/UDM and analyze whether the issue is with the UE or with the AMF.

In an embodiment of the disclosure, the AMF (300B) collects the TAI and CAG ID from the genuine gNB and also the AMF (300B) collects the UE (100) provided TAI and CAG ID and send it to NWDAF for analysis.

In another embodiment of the disclosure, the NWDAF (200) compares both the TAI and CAG ID received from AMF for the requested UE (i.e., genuine gNB broadcasted TAI and TAI in AMF report for UE's abnormality). If the TAI does not match, NWDAF performs the analytics (i.e., identification of DoS attack at the UE).

In another embodiment of the disclosure, the NWDAF (200) requests the OAM (300G) to provide UE mobility related and RAN specific information to perform the analytics for DoS attack.

Operation 11: The NWDAF (200) provides the analytics for DoS attack Identification to the consumer NF through Nnwdaf_AnalyticsSubscription_Notify. The message includes Internal group Identifier or SUPI, DNN, S-NSSAI, Analytics ID, Exception category, Exception indication, Exception ID. The consumer NF (400) starts a DoS Mitigation after receiving the derived analytics from the NWDAF (200). The Exception ID, Exception category as defined as follows: Exception ID="Suspicion of Dos attack". Exception category: "Authentication failure".

In an embodiment of the disclosure, the dispersion analytics is considered as one of the use cases for DOS attack detection.

The AMF (300B) and the SMF (300C) can provide either per UE transaction or optionally if subscription with periodic notification is requested an amount of UE transactions exchanged at the location. Dispersion analytics results can be used to predict the signaling storm for an Area of Interest (AOI) by the NWDAF (200) and the output result (e.g., signaling overload and failed transactions) can be used to detect the presence of DoS attack at the network.

In another embodiment of the disclosure, the NWDAF (200) detects those UEs that deviates from the expected UE behavior i.e., based on the unexpected transaction dispersion amount.

In another embodiment of the disclosure, the information about the TAIs provides the area in which the dispersion/attack occurs.

Possible mitigation and/or corrective actions:

In an embodiment of the disclosure, if the issue is with the AMF (300B), the AUSF (300A), the gNB, particular TAI or CAG ID or PCI, then the NWDAF (200) provides remarks to the network (for example, OAM server) to act on it.

In another embodiment of the disclosure, if the NWDAF (200) identifies the back off timer takes more time for certain UE (e.g., back off timer will be more for the UE with denial of access than the genuine UE) which provides the denial of access, then NWDAF marks it as a malicious UE.

TABLE 3

| Information | Description |
|---|---|
| UE ID | SUPI (UE ID in which the exception occurred) |
| > DNN | DNN for the PDU Session that SMF collects Data |
| > S-NSSAI | S-NSSAI for the PDU Session that SMF collects Data |
| > Start time of data collection | Start time of data collection |
| > End time of data collection | End time of data collection |
| >> Timestamp | A time stamp when AMF receives NAS message from UE |
| >> Timestamp | A time stamp when AMF sends NAS message to UE |
| >> Provided backoff timer | A value of backoff timer provided to UE |
| >>AUSF ID | AUSF which involved in authentication procedure |
| >>AMF ID | AMF in which mobility and tracking information that NWDAF collects data |
| >> TAI | Tracking Area selected by the UE |
| >>CAG ID | (Optional) UE selected CAG Cell |
| >>PCI | PCI in which the exception occurred |
| >>Downlink Frequency | Frequency range at which the exception occurred |
| >> Exception ID | Suspicion of MitM Attack |
| >>Exception Category | Registration failure |
| > SM NAS request from UE (1max) (if applicable) | Information on SM NAS messages that SMF receives from UE for PDU Session |
| >> Type of SM NAS request (if applicable) | A type of SM NAS message transmitted by UE (e.g., PDU session establishment request, PDU session modification request, or the like) |
| >>VPLMN ID | UE selected serving network ID |
| >>RAN UE ID | Uniquely identify the UE over NG interface |

Inputs provided by the AMF (300B) and an NG-RAN (500) to the NWDAF (200) for the MitM analytics is provided in Table 3. The AMF (300B) and the NG-RAN (500) include at least one of the parameters (in the table) as the input for analytics derivation.

Output from the NWDAF (200) to consumer NF (400) is provided in Table 4.

TABLE 4

| Information | Description |
|---|---|
| > DNN (NOTE) | DNN that MitM is applied |
| > S-NSSAI (NOTE) | S-NSSAI that MitM is applied |
| > List of UEs classified based on experience level of DoS | One or more than one of the following lists (SUPI is used to identify UE) |
| >> Exception ID | Suspicion of MitM Attack |
| >>Exception category | Indication for Registration failure |
| >> Analytics ID | To indicate when the analytics are derived and based on what event ID |

In an embodiment of the disclosure, in addition to MitM and DoS attack, the NWDAF (200) categorize the genuine authentication failure with error cause i.e., an "error" due to radio conditions (e.g., a radio link failure-DRNS internal failure, congestion, lost radio interface synchronization due to bas radio condition, loss of UL synchronization, or the like.

Figure 4:
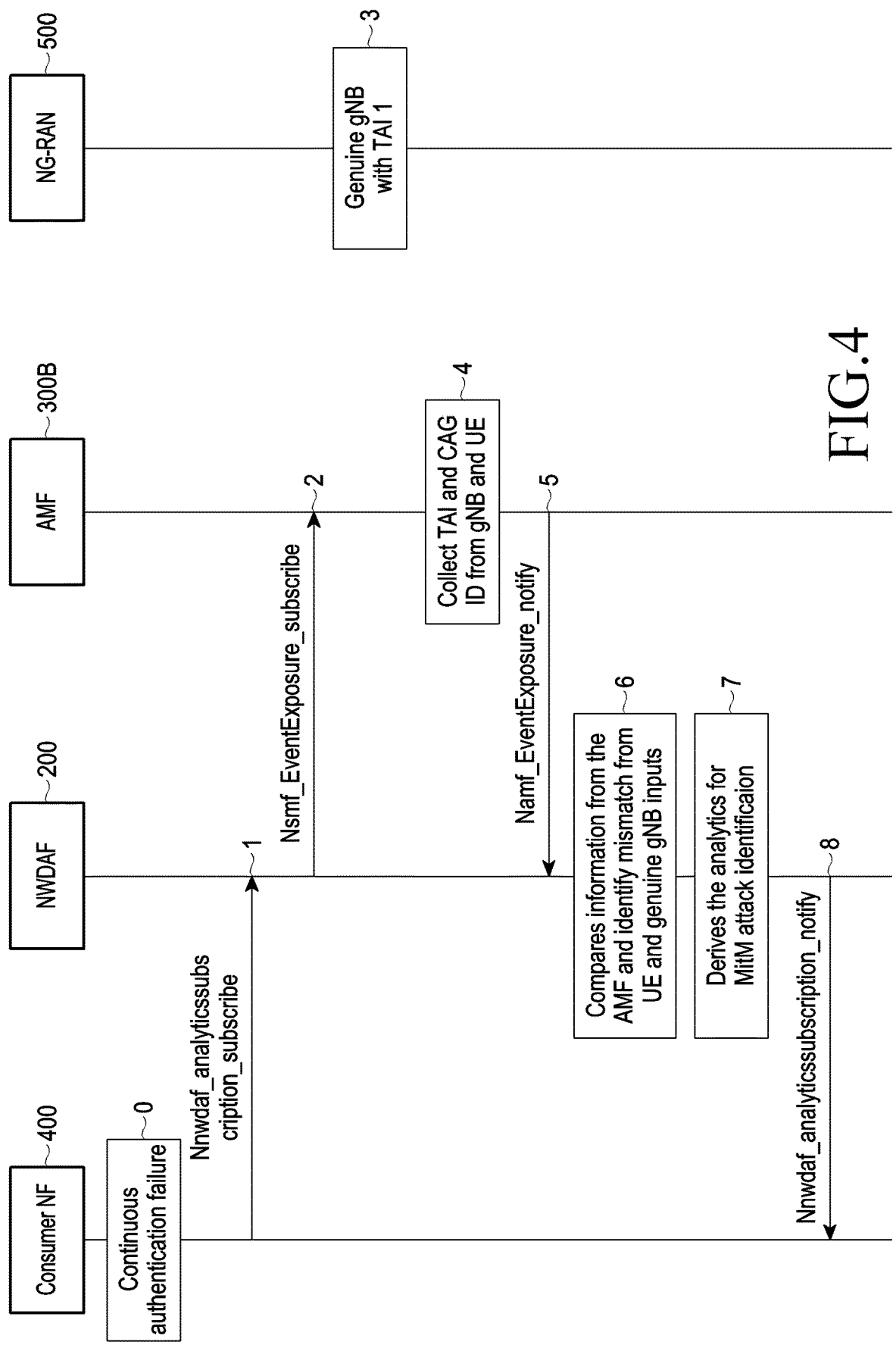
FIG. 4 is a signaling diagram illustrating NWDAF checking for abnormality in registration failure a man in the middle (MitM) attack (MitM attack), according to an embodiment of the disclosure.

FIG. 4 is a signaling diagram illustrating NWDAF checking for abnormality in registration failure (MitM attack) according to an embodiment of the disclosure.

Referring to FIG. 4, the operations include the following:

Operation 0: The consumer NF (400) (e.g., AMF) observes the continuous registration failure.

Operation 1: The consumer NF (400) (e.g., SMF, PCF, AMF, or the like) requests to/subscribes to the NWDAF (200) using Nnwdaf_AnalyticsSubscription_Subscribe/nwdaf_AnalyticsInfo_Request (Analytics ID set to "MitM attack identification", Target of Analytics Reporting=Internal-Group-Identifier, any UE or SUPI, Analytics Filter Information) for obtaining analytics information on the "MitM attack Identification".

Derived Analytics are provided by the NWDAF (200) if the consumer NF (400) wants to take the analytics information into account when applying the MitM mitigation and/or MitM identification.

The consumer NF (400) may subscribe to/request signaling failure notification/response from NWDAF for a group of UEs, any UE or a specific UE. The Analytics ID indicates the NWDAF (200) to identify misused or hijacked UEs through signaling failure analytic.

Operation 2: NWDAF (200) to AMF (300B): Namf_EventExposure_Subscribe (Event ID(s), Event Filter(s), Internal-Group-Identifier, any UE or SUPI). The NWDAF (200) sends subscription requests to the related AMF(s) if it has not subscribed to such data.

Operation 3: A Genuine gNB broadcast its TAI (i.e., TAI1).

Operation 4: the AMF (300B) collects the TAI and CAG ID broadcasted by the genuine gNB. The AMF (300B) also collects the PCI, Downlink frequency, RAN UE NGAP ID, or the like, from the genuine gNB. Similarly, the AMF (300B) collects the information (TAI, CAG ID) provides by the UE (100) during registration request.

Operation 5: The AMF (300B) sends the event reports to the NWDAF (200) over Namf_EventExposure_Notify based on the report requirements contained in the subscription request received from the NWDAF (200).

The event report includes at least one of the following parameters: UE characteristics (e.g., a UE ID, an internal group Identifier, a list of authorized UEs under TA requested, or the like) and all other parameters defined in TS 23.502 clause 4.15.1.

In another embodiment of the disclosure, the AMF (300B) further provides the parameters, such as SUCI, tracking area identity (TAI), CAG ID (if applicable), PCI, downlink frequency (DL frequency), AMF ID, AUSF ID, RI and other possible parameters, or the like.

In an embodiment of the disclosure, the AMF (300B) obtains the PCI and DL frequency from the NG-RAN (500) and send it to the NWDAF (200) for further analytic derivation.

In an embodiment of the disclosure, if the TAI provided by the UE (100) in the registration request (for e.g., TA3) is different from the tracking area broadcasted by the genuine gNB (i.e., TA1), AMF (300B) rejects the registration request.

In an embodiment of the disclosure, an expected UE behavior is offered to the AMF (300B) as a part of Access and Mobility Subscription Data. If the actual UE (100) behavior varies from the expected UE behavior, then the AMF (300B) provides the exception indication with exception ID to the NWDAF (200). The event report includes at least one of the following parameters: UE characteristics (e.g., a UE ID, an internal group Identifier, a list of authorized UEs under TA requested, or the like) and all other parameters defined in TS 23.502 clause 4.15.1.

Along with the event report, the AMF (300B) also includes TAI (in which the registration failure occurs), CAG ID (UE selected CAG ID), PCI, RAN UE NGAP ID, downlink frequency, the exception indication and exception category for the abnormal UE and/or UE(s) based on the latest observation or analysis. Exception category includes which type of failure cases has been occurred or observed and exception indication defines the reason for failure. Exception category: Registration failure, Exception indication: Mismatch in TAI values received from UE and broadcasted by genuine gNB.

Operation 6: The NWDAF (200) compares the AMF (300B) provided information and identifies the mismatch in inputs received from the genuine gNB and from the UE (100).

Operation 7: Based on the analysis or observation (If there is a miss match), the NWDAF (200) derives the analytics for man in the middle attack and reason for registration failure.

In an embodiment of the disclosure, data analytics may be performed on TAI, AMF ID, PCI, CAG ID based on the received data.

Operation 8: The NWDAF (200) provides the analytics for MitM attack identification to the consumer NF through Nnwdaf_AnalyticsSubscription_Notify. The message includes an internal group identifier or SUPI, DNN, S-NSSAI, analytics ID, exception category, exception indication, and an exception ID. The consumer NF starts DoS Mitigation after receiving the derived analytics from the NWDAF. The exception ID, exception category, exception indication as defined as follows: exception ID="Suspicion of MitM attack". Exception category: "Registration failure". Exception indication: "Mismatch in TAI values received from UE and broadcasted by genuine gNB".

Possible mitigation and/or corrective actions: in an embodiment of the disclosure, if the registration failure occurs due to unexpected UE location (TA or cells which the UE stays), then the PCF may extend the Service Area Restrictions with current UE location. The AMF (300B) may extend the mobility restriction with current UE location.

In another embodiment of the disclosure depending on the exception ID, the NWDAF may in addition perform data collection from OAM as specified in clause 6.2.3.2. of TS 23.288. Based on that OAM indicates the mitigation needs to be taken for each failure case.

In another embodiment of the disclosure, the OAM (300G) collects the RAN specific information from the NG-RAN (500) and provides to the NWDAF (200) as an input to derive analytics for MitM attacks and DoS attacks.

The SMF (300C) and the AMF (300B) provides exception (for registration failure) to the NWDAF (200) for the UE(s) performing DoS.

Malicious UEs can hijack the communication between legitimate UE and the 5G core network. Based on the results, malicious UEs acts as legitimate UEs and try to access the 5GC network and request for service. With this, it is preventing legitimate UEs getting the service from core network.

In such cases, in an embodiment of the disclosure, when a request from malicious UE occurs, the AMF (300B) should reject the registration request and whenever the NWDAF (200) requests for subscribed events, the AMF (300B) provides the exception indication with reason for registration failure.

In another embodiment of the disclosure, the NWDAF (200) is subscribed to the SMF (300C) for DoS attack identification analytics. Whenever a malicious UE sends unexpected PDU session update request or PDU session establishment request, the SMF (300C) should identify the unexpected requests. Once there is request for subscribed events from the NWDAF (200), the SMF (300C) provides the exception indication for the respective event IDs by including the reason for service failure.

In an embodiment of the disclosure, if the issue is with the AMF (300B), the AUSF (300A), the gNB, particular TAI or CAG ID or PCI, then the NWDAF (200) provides remarks to the network (for example, an OAM server) to act on it.

In another embodiment of the disclosure, if the NWDAF (200) identifies the back off timer takes more time for certain UE (e.g., back off timer will be more for the UE with denial of access than the genuine UE) which provides the denial of access, then NWDAF (200) marks it as a malicious UE.

TABLE 5

| Information | Description |
| --- | --- |
| UE ID | SUPI |
| > DNN | DNN for the PDU Session that SMF collects Data |
| > S-NSSAI | S-NSSAI for the PDU Session that SMF collects Data |
| > Start time of data collection | Start time of data collection |
| > End time of data collection | End time of data collection |
| >> Timestamp | A time stamp when SMF receives SM NAS message from UE |
| >> Type of SM NAS message from network | A type of SM NAS message with backoff timer provided to UE (e.g., PDU session establishment reject, PDU session modification reject, PDU session release command, or the like) |
| >> Timestamp | A time stamp when SMF sends SM NAS message to UE |
| >> Provided backoff timer | A value of backoff timer provided to UE |
| > SM NAS request from UE (1max) | Information on SM NAS messages that SMF receives from UE for PDU Session |
| >> Type of SM NAS request | A type of SM NAS message transmitted by UE (e.g., PDU session establishment request, PDU session modification request, or the like) |
| >> Exception ID | Suspicion of Dos Attack |
| >>Exception Indication | Indication for SMF service failure |
| >>RAN UE ID | Uniquely identify the UE over NG interface |
| >>VPLMN ID | UE selected serving network ID |

Inputs provided by the SMF (300C) to the NWDAF (200) for DoS analytics is provided in Table 5. The SMF (300C) includes at least one of the parameters (in the table) as the input for analytics derivation.

TABLE 6

| Information | Description |
| --- | --- |
| UE ID | SUPI (UE ID in which the exception occurred) |
| > DNN | DNN for the PDU Session that SMF collects Data |
| > S-NSSAI | S-NSSAI for the PDU Session that SMF collects Data |
| > Start time of data collection | Start time of data collection |
| > End time of data collection | End time of data collection |
| >> Timestamp | A time stamp when AMF receives NAS message from UE |
| >> Timestamp | A time stamp when AMF sends NAS message to UE |
| >> Provided backoff timer | A value of backoff timer provided to UE |
| >>AMF ID | AMF in which mobility and tracking information that NWDAF collects data |
| >>CAG ID | (Optional) UE selected CAG Cell |
| >>PCI | PCI in which the exception occurred |
| >>Downlink Frequency | Frequency range at which the exception occurred |
| >> Exception ID | Suspicion of Dos Attack |
| >>Exception Category | Registration failure |

Inputs provided by the AMF (300B) to the NWDAF (200) for DoS analytics is provided in Table 6. The AMF (300B) includes at least one of the parameters (in the table) as the input for analytics derivation.

TABLE 7

| Information | Description |
| --- | --- |
| > DNN (NOTE) | DNN that DoS is applied |
| > S-NSSAI (NOTE) | S-NSSAI that DoS is applied |
| > List of UEs classified based on experience level of DoS | One or more than one of the following lists (SUPI is used to identify UE) |
| >> Exception ID | Suspicion of Dos Attack |
| >>Exception Indication | Indication for service failure |
| >> Analytics ID | To indicate when the analytics are derived and based on what event ID |

Table 7 includes output provided by the NWDAF (200) to the consumer NF (400) after the analytics.

In an embodiment of the disclosure, in addition to MitM and DoS attack, the NWDAF (200) categorize the genuine authentication failure, i.e., an "error" due to radio conditions (e.g., a radio link failure-DRNS internal failure, a congestion, a lost radio interface synchronization due to bas radio condition, loss of UL synchronization, or the like).

Figure 5:
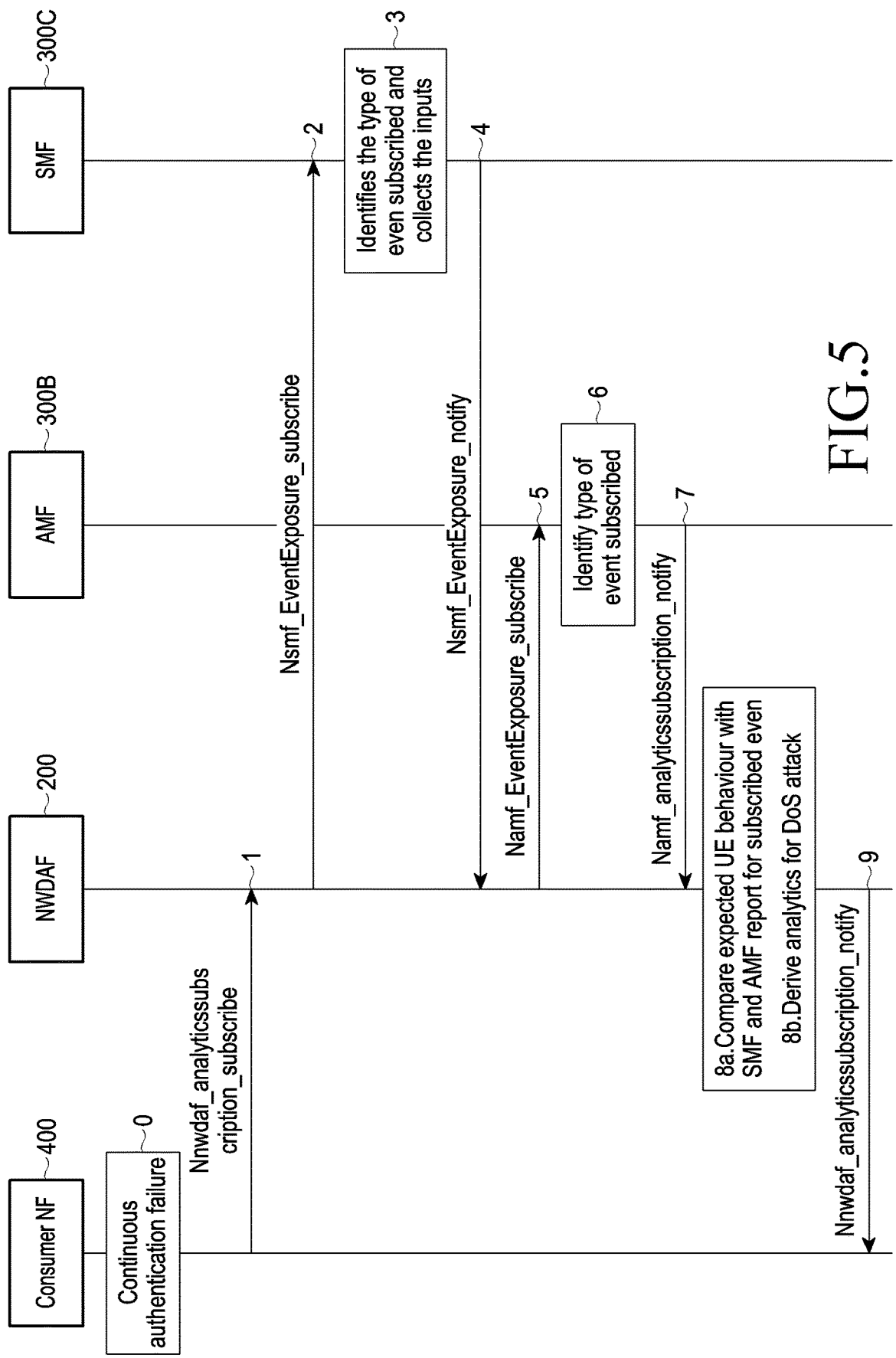
FIG. 5 is a signaling diagram illustrating an authentication management function (AMF) and a session management function (SMF) providing inputs to NWDAF for deriving analytics for DoS detection according to an embodiment of the disclosure.

FIG. 5 is a signaling diagram illustrating AMF and SMF providing inputs to NWDAF for deriving analytics for DoS detection according to an embodiment of the disclosure.

Referring to FIG. 5, the operations include the following:

Operation 1: The consumer NF (400) (e.g., SMF, PCF, AMF, or the like) requests to/subscribes to the NWDAF (200) using Nnwdaf_AnalyticsSubscription_Subscribe/nwdaf_AnalyticsInfo_Request (Analytics ID set to "DoS attack identification", Target of Analytics Reporting=Internal-Group-Identifier, any UE or SUPI, Analytics Filter Information) for obtaining analytics information on "DoS attack Identification". The derived Analytics are provided by the NWDAF (200) if the consumer NF (400) wants to take the analytics information into account when applying the DoS mitigation and/or DoS identification.

The consumer NF (400) may subscribe to/request signaling failure notification/response from the NWDAF (200) for a group of UEs, any UE or a specific UE. The Analytics ID indicates the NWDAF to identify misused or hijacked UEs through signaling failure analytic.

Operation 2: NWDAF (200) to SMF (300C): Nsmf_EventExposure_Subscribe (Event ID(s), Event Filter(s), Internal-Group-Identifier, any UE or SUPI). The NWDAF (200) sends subscription requests to the related SMF(s) if it has not subscribed to such data.

Operation 3: The SMF (300C) identifies the event subscribed by the NWDAF (200) (i.e., DoS Attack Identification). The SMF (300C) analyses the abnormalities in UE or any UE(s).

Operation 4: The SMF (300C) sends event reports to the NWDAF (200) over Nsmf_EventExposure_Notify based on the report requirements contained in the subscription request received from the NWDAF (200). The event report includes at least one of the following parameters. UE characteristics (e.g., a UE ID, an internal group identifier, a list of UEs under TA requested for SMF service, or the like), DNN, S-NSSAI, start time of data collection, end time of data collection, SM NAS request from UE, type of SM NAS message from UE (PDU session establishment request, PDU session modification request), time stamp at which SMF receives and sends SM NAS message, provided back off timer, type of SM NAS message from network (PDU session establishment reject, PDU session modification reject, PDU session release command). The SMF includes the exception indication for the abnormal UE and/or UE(s) based on the latest observation or analysis.

The expected UE (100) behavior is offered to the SMF (300C) and/or the AMF (300B) as a part of session management subscription data and access and mobility subscription data, respectively. If the actual UE behavior varies from the expected UE behavior, then the SMF (300C) provides the exception indication to the NWDAF (200). The SMF (300C) also includes the expected UE behavior in the report. Exception indication defines the reason for SMF service failure, e.g., reject in unexpected PDU session modification request and/or unexpected PDU session establishment request.

Operation 5: NWDAF (200) to AMF (300B): Namf_EventExposure_Subscribe (Event ID(s), Event Filter(s), Internal-Group-Identifier, any UE or SUPI). The NWDAF (200) sends subscription requests to the related AMF(s) (300B) if it has not subscribed to such data.

Operation 6: The AMF (300B) identifies the event subscribed by NWDAF (200) (i.e., DoS Attack Identification). The AMF (300B) also analyses the abnormalities in the UE (100) or any UE(s).

Operation 7: The AMF (300B) sends the event reports to the NWDAF (200) over Namf_EventExposure_notify based on the report requirements contained in the subscription request received from the NWDAF (200). The event report includes at least one of the following parameters. The UE characteristics (e.g., a UE ID, an internal group Identifier, a list of UEs under TA for this particular AMF), DNN, S-NSSAI, start time of data collection, end time of data collection, AMF ID, PCI, CAG ID, TAI, Downlink frequency, Exception ID, Exception Indication.

In an embodiment of the disclosure, the AMF (300B) collects the parameters (e.g., PCI and DL frequency) from the RAN and send to the NWDAF (200) for deriving analytics.

In an embodiment of the disclosure, the AMF (300B) includes the exception indication for the abnormal UE and/or UE(s) based on the latest observation or analysis.

In an embodiment of the disclosure, the expected UE behavior is offered to the SMF (300C) and/or the AMF (300B) as a part of session management subscription data and access and mobility subscription data, respectively. When the AMF (300B) detects frequent mobility re-registration of one or more UEs, the AMF (300B) checks the UE characteristics and compare the actual UE behavior with the expected UE behavior. Based on that AMF (300B) provides the exception indication to the NWDAF (200). The AMF (300B) also includes the expected UE behavior in the event report. The exception indication defines the reason for AMF service failure, such as unexpected UE ID, NAS message timeouts, NAS message integrity protection failure or registration failure, or the like.

Operations 8a-8b: With the data obtained in operation 4 and/or operation 7, the NWDAF (200) compares the expected UE behavior and the actual UE behavior. Based on that, the NWDAF (200) derives requested analytics. In an embodiment of the disclosure, data analytics may be performed on TAI, AMF ID, PCI, CAG ID based on the received data.

Operation 9: The NWDAF (200) provides the analytics for DoS attack identification to the consumer NF (400) through Nnwdaf_AnalyticsSubscription_Notify. The message includes Internal group Identifier or SUPI, DNN, S-NSSAI, Analytics ID, Exception indication, Exception ID. The consumer NF (400) starts DoS Mitigation after receiving the derived analytics from the NWDAF (200).

Possible mitigation and/or corrective actions: In an embodiment of the disclosure, the AMF (300B) should reject the registration request for the suspected UE and similarly the SMF (300C) should reject the PDU session establishment for the suspected UE.

In an embodiment of the disclosure, if there is an unexpected wakeup, the AMF (300B) applies MM back off timer to the UE (100).

In an embodiment of the disclosure, if the issue is with the AMF (300B), the AUSF (300A), gNB, particular TAI or CAG ID or PCI, then the NWDAF (200) provides remarks to the network (for example, OAM server) to act on it.

In another embodiment of the disclosure, if the NWDAF (200) identifies the back off timer takes more time for certain UE (e.g., a back off timer will be more for the UE with denial of access than the genuine UE) which provides the denial of access, then NWDAF marks it as a malicious UE.

Figure 6:
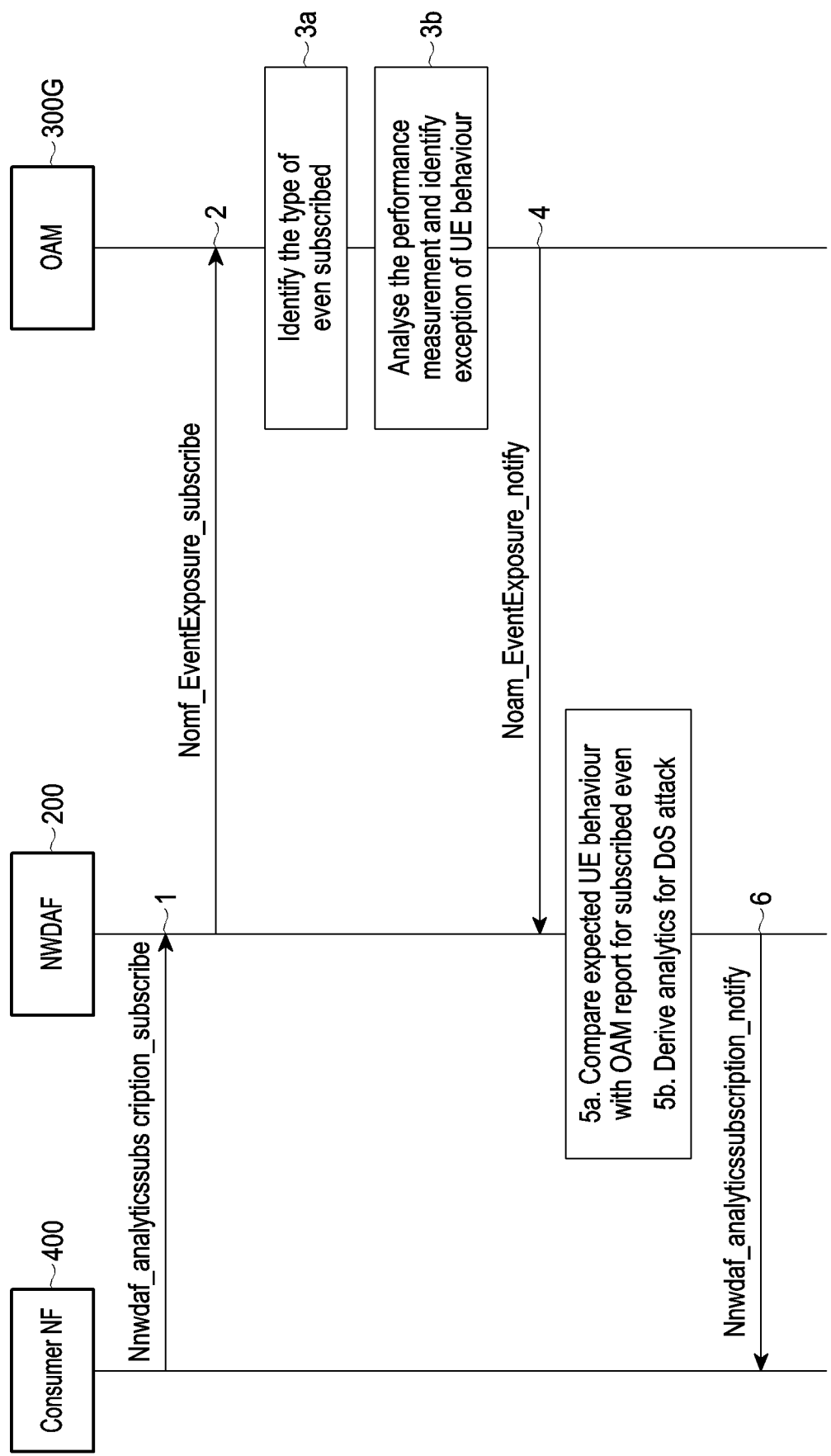
FIG. 6 is a signaling diagram illustrating operations, administration, and maintenance (OAM) providing inputs to NWDAF for DoS identification according to an embodiment of the disclosure.

FIG. 6 is a signaling diagram illustrating OAM providing inputs to NWDAF for DoS identification according to an embodiment of the disclosure.

Referring to FIG. 6, performance measurements provided by OAM (300G) will be used by the NWDAF (200) to determine congestion levels. Performance measurements are related to information transfer over the user plane and/or the control plane (e.g., a UE throughput, a DRB setup management, an RRC connection number, a PDU session management, and a radio resource utilization as defined in TS 28.552).

In an embodiment of the disclosure, in addition to MitM and DoS attack, the NWDAF (200) should categorize the genuine authentication failure, i.e., an "error" due to radio conditions (e.g., a radio link failure-DRNS internal failure, a congestion, a lost radio interface synchronization due to bas radio condition, a loss of UL synchronization, or the like.

Referring to FIG. 6, the operations are as follows:

Operation 1: The consumer NF (400) (e.g., SMF, PCF, AMF, or the like) requests to/subscribes to the NWDAF (200) using Nnwdaf_AnalyticsSubscription_Subscribe/nwdaf_AnalyticsInfo_Request (Analytics ID set to "DoS attack identification", Target of Analytics Reporting=Internal-Group-Identifier, any UE or SUPI, Analytics Filter Information) for obtaining analytics information on "DoS attack Identification". The derived Analytics are provided by the NWDAF (200) if the consumer NF (400)

wants to take the analytics information into account when applying the DoS mitigation and/or DoS identification.

The consumer NF (400) may subscribe to/request signaling failure notification/response from the NWDAF (200) for a group of UEs, any UE or a specific UE. The Analytics ID indicates the NWDAF (200) to identify misused or hijacked UEs through signaling failure analytic.

Operation 2: NWDAF (200) to OAM (300G): Noam_EventExposure_Subscribe (Event ID(s), Event Filter (s), Internal-Group-Identifier, any UE or SUPI).

The NWDAF (200) sends subscription requests to the related OAM(s) (300G) if it has not subscribed to such data.

Operation 3a: The OAM (300G) identifies the type of event is subscribed by the NWDAF (200) (i.e., DoS Attack Identification).

Operation 3b. The OAM (300G) collects the abnormalities in the UE mobility and communication information, congestion on the AMF (300B) and the SMF (300C), performance measurement on RAN (performance measurements are related to information transfer over the user plane and/or the control plane (e.g., a UE throughput, DRB setup management, RRC Connection Number, PDU session management, and radio resource utilization as defined in TS 28.552). OAM analyses the abnormalities in a UE or any UE(s) as per the event Id and event filter information.

Operation 4: The OAM (300G) sends the event report over Noam_EventExposure_Notify to the NWDAF (200). The event report includes at least one of the following parameters:

UE characteristics (e.g., a UE ID, an internal group identifier, a list of UEs under TA), TAI, CAG ID, AMF ID, SMF ID, start time of data collection, end time of data collection, PCI, Downlink frequency, RAN UE ID, VPLMN ID, C-RNTI, SM NAS request from a UE, a type of SM NAS message from a UE, or the like.

In an embodiment of the disclosure, the event report also includes, NAS message timeouts, NAS message integrity protection failure or registration failure, or the like.

Expected UE behavior is offered to the OAM (300G). The OAM (300G) checks the UE characteristics and compare the actual UE behavior with the expected UE behavior. The OAM (300G) also include the expected UE behavior in the report.

Operation 5: With the data obtained in operation 4, the NWDAF (200) compares the expected UE behavior and the actual UE behavior. Based on that the NWDAF (200) derives requested analytics.

In an embodiment of the disclosure, data analytics may be performed on TAI, AMF ID, PCI, CAG ID based on the received data.

Operation 6: The NWDAF (200) provides the analytics for DoS attack identification to the consumer NF (400) through Nnwdaf_AnalyticsSubscription_Notify. The message includes Internal group Identifier or SUPI, DNN, S-NSSAI, Analytics ID, Exception ID. The consumer NF starts DoS Mitigation after receiving the derived analytics from the NWDAF.

In an embodiment of the disclosure, if the unexpected radio link failures are per UE location bases, the AMF may allow the use of coverage enhancement (CE) in the affected location. In addition, the Operator may improve the coverage conditions in the affected location.

If the unexpected radio link failures are per UE bases, then the AMF (300B) and/or the AF (300F) may allow the use of CE for the affected UE (100).

Possible mitigation and/or corrective actions: The NWDAF (400) can conditionally indicate the exception ID to the OAM (300G). Based on the received exception ID. The OAM (300G) can indicate the AMF (300B) to reject the registration request causing the congestion. The OAM (300G) can indicate the SMF (300C) to reject the PDU session establishment request. The OAM (300G) can indicate the PCF to update the packet filter in the PCC Rules that triggers the SMF (300C) to update the related QoS flow and configures the UPF.

In an embodiment of the disclosure, if the issue is with the AMF (300B), AUSF (300A), gNB, particular TAI or CAG ID or PCI, then NWDAF provides remarks to the network (for example, OAM server) to act on it.

In another embodiment of the disclosure, if the NWDAF (200) identifies the back off timer takes more time for certain UE (e.g., a back off timer will be more for the UE with denial of access than the genuine UE) which provides the denial of access, then the NWDAF (200) marks it as a malicious UE.

Figure 7:
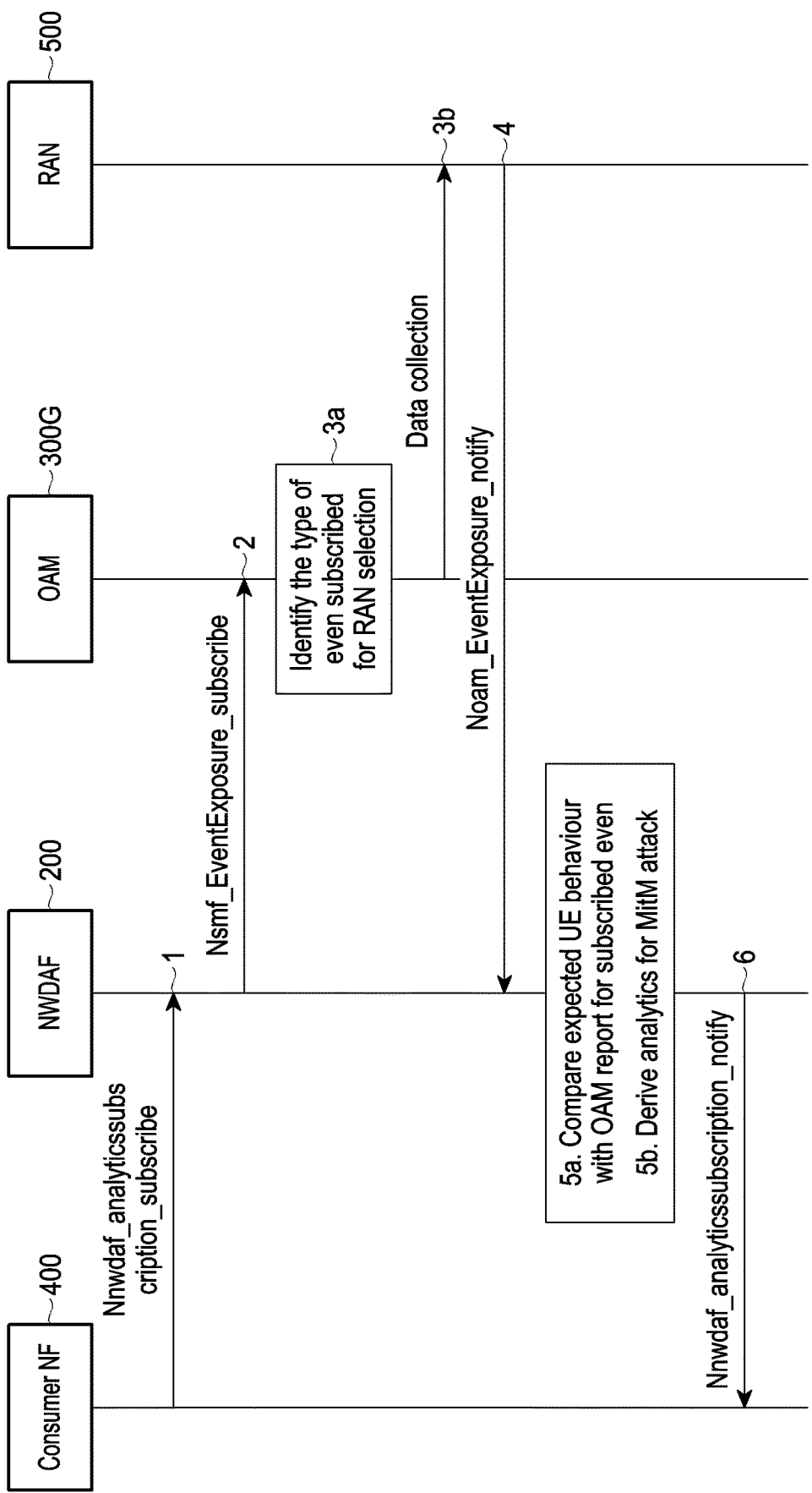
FIG. 7 is a signaling diagram illustrating OAM providing collected radio access network (RAN) inputs to NWDAF for MitM attack analytic derivation according to an embodiment of the disclosure.

FIG. 7 is a signaling diagram illustrating OAM providing collected RAN inputs to NWDAF for MitM attack analytic derivation according to an embodiment of the disclosure.

Referring to FIG. 7, in an embodiment of the disclosure, in addition to MitM and DoS attack, the NWDAF (200) should categorize the genuine authentication failure and send error cause. i.e., an "error" due to radio conditions (e.g., a radio link failure-DRNS internal failure, a congestion, a lost radio interface synchronization due to bas radio condition, a loss of UL synchronization, or the like.

Referring to FIG. 7, the operations are as follows:

Operation 1: The consumer NF (400) (e.g., SMF, PCF, AMF, or the like) requests to/subscribes to the NWDAF (200) using Nnwdaf_AnalyticsSubscription_Subscribe/nwdaf_AnalyticsInfo_Request (Analytics ID set to "MitM attack identification", Target of Analytics Reporting=Internal-Group-Identifier, any UE or SUPI, Analytics Filter Information) for obtaining analytics information on "MitM attack Identification". Derived Analytics are provided by the NWDAF (200) if the consumer NF (400) wants to take the analytics information into account when applying the MitM mitigation and/or MitM identification.

The consumer NF (400) may subscribe to/request signaling failure notification/response from the NWDAF (200) for a group of UEs, any UE or a specific UE. The Analytics ID indicates the NWDAF to identify misused or hijacked UEs through signaling failure analytic.

Operation 2: NWDAF (200) to the OAM (300G): Noam_EventExposure_Subscribe (Event ID(s), Event Filter(s), Internal-Group-Identifier, any UE or SUPI).

The NWDAF (200) sends subscription requests to the related OAM(s) if it has not subscribed to such data.

Operation 3a: The OAM (300G) identifies the type of event is subscribed by the NWDAF (200) (i.e., MitM Attack Identification). The OAM (300G) also performs the RAN selection for data collection.

Operation 3b. The OAM (300G) performs the data collection from the RAN in which the UE (100) is connected. The OAM (300G) collects the performance measurement on RAN (Performance Measurements are related to information transfer over the user plane and/or the control plane (e.g., a UE throughput, DRB setup management, RRC connection number, PDU session management, and radio resource utilization as defined in TS 28.552). OAM analyses the abnormalities in UE or any UE(s) as per the event Id and event filter information.

Operation 4: The OAM (300G) sends the event report over Noam_EventExposure_Notify to the NWDAF (200). The event report includes at least one of the following parameters: UE characteristics (e.g., a UE ID, an internal group identifier, a list of UEs under TA), TAI, CAG ID, C-RNTI, downlink frequency, PCI, RAN UE ID, VPLMN ID, start time of data collection, end time of data collection, the manipulation of chosen fields in MIB/SIBs, arbitrary bit flipping of signed MIB/SIBs, replay of signed MIB/SIBs, broadcast MIB/SIBs with invalid signatures and also by manipulation of timing information in a UE or gNBs, an SM NAS request from a UE, a type of SM NAS message from a UE, or the like.

The expected UE behavior is offered to the OAM (300G). The OAM (300G) checks the UE characteristics and compare the actual UE behavior with the expected UE behavior. Based on that OAM provides the exception indication to the NWDAF (200). The OAM (300G) also include the expected UE behavior in the report.

Operation 5: With the data obtained in operation 4, the NWDAF (200) compares the expected UE behavior and the actual UE behavior. Based on that the NWDAF (200) derives requested analytics.

In an embodiment of the disclosure, data analytics may be performed on TAI, AMF ID, PCI, CAG ID based on the received data.

Operation 6: The NWDAF (200) provides the analytics for MitM attack Identification to the consumer NF through Nnwdaf_AnalyticsSubscription_Notify. The message includes internal group Identifier or SUPI, DNN, S-NSSAI, Analytics ID, Exception indication, Exception ID. The consumer NF (400) starts MitM Mitigation after receiving the derived analytics from the NWDAF (200).

In an embodiment of the disclosure, if the unexpected radio link failures are per UE location bases, the AMF (300B) may allow the use of coverage enhancement (CE) in the affected location. In addition, the Operator may improve the coverage conditions in the affected location.

If the unexpected radio link failures are per UE bases, then the AMF (300B) and/or the AF (300F) may allow the use of CE for the affected UE the Dos attack on the network side AMF (300B) provides the exception of SMF performing DoS: In this alternative it is assumed that the AMF (300B) is the consumer NF (400). The DoS attack on SMF (300C) makes the SMF (300C) unavailable for the subscribed users and in such cases, there may be continuous SMF service failure (e.g., an unexpected PDU session reject, an unexpected PDU session release or PDU session update, or the like.

In another embodiment of the disclosure, the SMF (300C) service gets failed due to DNN based congestion or S-NSSAI based congestion at the SMF (300C) by malicious or hijacked UEs. Therefore, in such scenarios after receiving event subscription request from the NWDAF (200), the AMF (300B) needs to identify the reason for SMF (300C) service failure and based on that AMF (300B) requests the analytics from the NWDAF (200).

The OAM (300G) provides the exception of RAN performing DoS: In this alternative it is assumed that the OAM (300G) is the consumer NF (400). The DoS attack on RAN makes the RAN unavailable for the subscribed users.

Performance measurements are related to information transfer over the user plane and/or the control plane (e.g., a UE throughput, DRB setup management, RRC connection number, PDU session management, and radio resource utilization as defined in TS 28.552). The NWDAF may obtain measurements by invoking management services that are defined in TS 28.532 and TS 28.550. Therefore, in such cases the OAM (300G) identifies the exception in RAN performance and the OAM (300G) requests for analytics from the NWDAF (200).

The OAM (300G) provides the exception of AMF (300B) performing DoS: The AMF (300B) rejects the continuous registration request from UEs, whose SUPI belongs to different region or unexpected GUTI, (i.e., not under the TA of this particular AMF). DoS Attack on the AMF (300B) makes the AMF (300B) unavailable for the subscribed user. Therefore, in such scenarios after receiving event subscription request from the NWDAF (200), the OAM (300G) needs to identify the reason for AMF (300B) service failure and/or continuous registration request failure and based on that the OAM (300G) requests for analytic from the NWDAF (200).

In another embodiment of the disclosure, even after the primary authentication is successful, the AMF (300B) reports a registration failure to UDM (300E). In such cases the UDM (300E) should be able to provide the exception indication on the AMF (300B) to the NWDAF (200) to derive the analytics.

Possible mitigation and/or corrective actions: In case of DoS attack in V-AMF, the AMF re-allocation is recommended so that it will span a new AMF, by retaining the old context with a new IP.

The OAM (300G) can indicate the AMF (300B) to inform the UE (100) to select a new cell or to re-allocate the AMF (300B) to serve the UE (100) based on its location update.

In an embodiment of the disclosure, the NAS procedure being one of: authentication procedure, registration procedure, service request procedure, PDU session establishment procedure, UE configuration update procedure.

In another embodiment of the disclosure, the recovery mechanism being at least one of: release of resources reserved for the UE (100) in the network, indicating the UE (100) to move out of the current cell or tracking area or serving PLMN, indicating the UE (100) to update the configuration (using PARLOS or onboarding procedure), indicating to the UE (100) an appropriate backoff timer value, or the like.

In an embodiment of the disclosure, the consumer NF (400) requests the NWDAF (200) for sharing analytics information associated with the UE (100). The consumer NF (400) identifies an anomalous activity and based on the observation, the consumer NF (400) requests the NWDAF (200) to perform the analytics and identifies that the abnormality is due to which cyber-attack.

Figure 8:
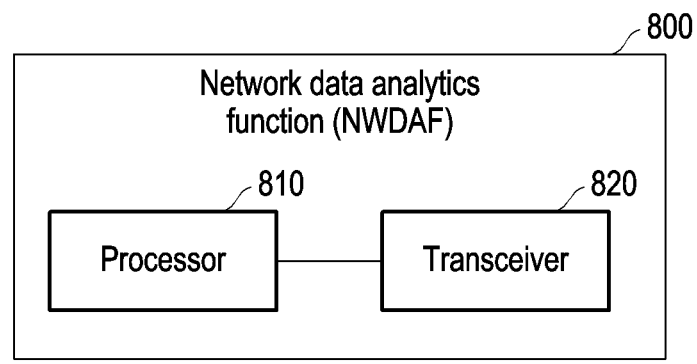
FIG. 8 is a view illustrating an internal structure of a network data analytics function (NWDAF) according to an embodiment of the disclosure.

FIG. 8 is a view illustrating an internal structure of a network data analytics function (NWDAF) according to an embodiment of the disclosure.

Referring to FIG. 8, according to an embodiment of the disclosure, a NWDAF 800 may include at least one controller (e.g., at least one processor) 810 and a transceiver 820 including a receiver and a transmitter. The location management device may include a memory (not shown). The transceiver 820 and the memory may be connected to the at least one controller 810 to be operated under the control of the at least one controller 810.

The at least one controller 810 may control a series of steps to perform the operation of the NWDAF described in connection with the embodiments. The transceiver 820 may transmit and receive signals to/from the consumer NF 900 and any other devices.

Figure 9:
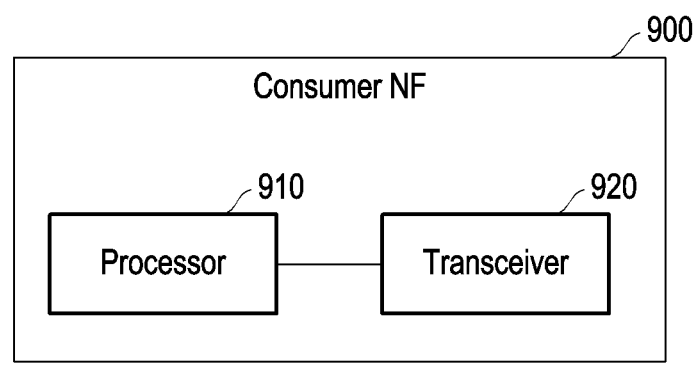
FIG. 9 is a view illustrating an internal structure of a consumer NF according to an embodiment of the disclosure.

FIG. 9 is a view illustrating an internal structure of a consumer NF according to an embodiment of the disclosure.

Referring to FIG. 9, according to an embodiment of the disclosure, a consumer NF 900 may include at least one controller (e.g., at least one processor) 910 and a transceiver 920 including a receiver and a transmitter. The location management device may include a memory (not shown).

The transceiver 920 and the memory may be connected to the at least one controller 910 to be operated under the control of the at least one controller 910.

The at least one controller 910 may control a series of steps to perform the operation of the consumer NF described in connection with the embodiments. The transceiver 920 may transmit and receive signals to/from the NWDAF 800 and any other devices.

In an embodiment of the disclosure, a method performed by network data analytics function (NWDAF), the method comprising: receiving a request for sharing analytics information associated with a user equipment (UE) from a consumer network function (NF); requesting the analytics information associated with the UE to at least one $5^{th}$ generation core (5GC) network entity; receiving the analytics information associated with the UE from the at least one 5GC network entity; comparing an expected behavior of the UE with an actual behavior based on the analytics information provided by the at least one 5GC network entity; deriving analytics associated with a cyber-attack based on the analytics information and a result of the comparing of the expected behavior of the UE; and sending the analytics associated with the cyber-attack on the UE to the consumer NF.

In addition, the method comprises receiving, by the consumer NF, requested analytics information associated with the UE from the NWDAF; and indicating, by the consumer NF, a recovery mechanism for the cyber-attack based on the analytical information received, to the UE.

In addition, wherein the recovery mechanism comprises at least one of: a release of resources reserved for the UE in a $5^{th}$ generation core network; an indication the UE to move out of one of a current cell, a tracking area and a serving public land mobile network (PLMN); an indication to the UE to update a UE configuration; or an indication to the UE for an appropriate backoff timer value.

In addition, wherein the cyber-attack includes one of a denial-of-service (DoS) attack, a man in the middle (MitM) attack, or an impersonation.

In addition, wherein the receiving, by the NWDAF, of the request for sharing analytics information associated with the UE comprises: detecting, by the consumer NF, a continuous failure of a non-access-stratum (NAS) procedure of the UE with a 5Gc network; determining, by the consumer NF, a possibility of the cyber-attack on the UE based on the detected continuous failure of the NAS procedure; and sending, by the consumer NF, a request for sharing analytics information associated with the UE to the NWDAF.

In addition, wherein the NAS procedure includes one of an authentication procedure, a registration procedure, a service request procedure, a packet data unit (PDU) session establishment procedure, or a UE configuration update procedure.

In addition, wherein the requesting, by the NWDAF, of the analytics information associated with the UE to at least one 5GC network entity comprises: sending, by the NWDAF, a request to a unified data management (UDM), an authentication server function (AUSF) and an access and mobility management function (AMF) for sharing information associated with a DoS attack, wherein the request comprises an event identity (ID), an event filter, and an internal-group-Identifier.

In addition, wherein the requesting, by the NWDAF, of the analytics information associated with the UE to the at least one 5GC network entity comprises: sending, by the NWDAF, a request to an Access and mobility management function (AMF) for sharing information associated with a man in the middle (MitM) attack, wherein the request comprises an event Identity (ID), an event filter, and an internal-group-identifier.

In addition, wherein the receiving, by the NWDAF, of the analytics information associated with the cyber-attack from the at least one 5GC network entity comprises: receiving, by the NWDAF, an event report comprising an AUSF ID, a subscription permanent identifier (SUPI) for the UE which is under a DoS attack, a back-off timer and an exception category associated with a UE performing the DoS attack, from the UDM; receiving, by the NWDAF, the event report comprising an authentication management function (AMF) ID and a SUPI ID for the UE which is under the DoS attack, a backoff timer and an exception category associated with a UE performing the DoS attack, from the AUSF; receiving, by the NWDAF, a mapping comprising an indication on which N1 interface a NAS authentication has failed for the corresponding UE from the AMF; checking, by the AMF, a failed SUPI corresponding to a subscription concealed identifier (SUCI) of the corresponding UE; and receiving, by the NWDAF, an event report comprising a SUCI, a tracking area identity (TAI), a closed access group identifier (CAG ID), a physical cell ID (PCI), a downlink (DL) frequency, a backoff timer and an exception category associated with the UE performing the DoS attack, from the AMF.

In addition, wherein the sending, by the NWDAF, of the analytics information associated with the cyber-attack during an analysis to the consumer NF comprises: sending, by the NWDAF, an exception ID indicating a suspicion of the DoS attack, an exception category of failure, UE characteristics, a SUPI list, and a list of UEs classified based on experience level of the DoS attack to the consumer NF; and performing, by the consumer NF, a release of a resource associated with the UE based on the analytic results provides by the NWDAF.

In addition, wherein the receiving, by the NWDAF, of the analytics information associated with the cyber-attack from the at least one 5GC network entity comprises: checking, by an AMF, a TAI broadcasted by a genuine gNB and provided by the UE during a registration request of the UE; receiving, by the NWDAF, an event report which includes a SUCI, TAI, CAG ID, PCI, RAN UE ID, backoff timer and an exception category associated with the UE performing MitM attack, from the AMF; comparing, by the NWDAF, the actual UE behavior and the expected UE behavior provided by the AMF; and receiving, by the NWDAF, the event report associated with the MitM attack from an operations, administration and maintenance (OAM).

In addition, wherein the sending, by the NWDAF, of the analytics information associated with the cyber-attack during an analysis to the consumer NF comprises: sending, by the NWDAF, an exception ID corresponding to a suspicion of an MitM attack, an exception category, UE characteristics, a SUPI list, and a list of UEs classified based on experience level of the MitM attack to the consumer NF; and performing, by the consumer NF, a release of resource with the UE based on the analytics information provides by the NWDAF.

In an embodiment of the disclosure, A wireless network system for detecting cyber-attacks using network analytics in a user equipment (UE), the wireless network system comprising: the UE; at least one $5^{th}$ generation core (5GC) network entity; a consumer network function (NF); and a network data analytics function (NWDAF) configured to: receive a request for sharing analytics information associated with the UE from the NF, request the analytics information associated with the UE and causing the cyber-attack to at the least one 5GC network entity, receive the analytics information associated with the UE from the at least one 5GC network entity, compare an expected behavior of the UE with an actual behavior based on the analytics information provided by the at least one 5GC network entity, derive analytics associated with the cyber-attack based on the analytics information and a result of the comparing of the expected behavior of the UE, and send the analytics associated with the UE to the consumer NF.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network data analytics function (NWDAF) in a wireless communication system, the method comprising:
   receiving, from a consumer network function (NF), a request for analytics associated with a user equipment (UE);
   requesting analytics information associated with the UE to at least one network entity;
   receiving, from the at least one network entity, the analytics information, wherein the received analytics information includes at least one tracking area identity (TAI);
   comparing an expected parameter related to the UE with an actual parameter related to the UE based on the at least one TAI included in the analytics information;
   deriving analytics associated with detection of an attack on the UE from a result of the comparing of the expected parameter of the UE; and
   transmitting, to the consumer NF, the analytics associated with the detection of the attack on the UE,
   wherein the expected parameter related to the UE includes a TAI collected from a base station and the actual parameter related to the UE includes a TAI collected from the UE.

2. The method of claim 1, wherein the attack includes one of a denial-of-service (DOS) attack, a man in the middle (MitM) attack, or an impersonation.

3. The method of claim 1,
   wherein the requesting of the analytics information includes:
   stransmitting, a request to at least one of a unified data management (UDM), an authentication server function (AUSF) and an access and mobility management function (AMF) for information associated with a DOS attack, and
   wherein the request includes at least one of an event identity (ID), an event filter, and an internal-group-identifier.

4. The method of claim 3,
   wherein the receiving of the analytics information includes:
      receiving, from the UDM, an event report including at least one of an AUSF ID, a subscription permanent identifier (SUPI) for the UE which is under a DOS attack, a back-off timer, and an exception category associated with the UE performing the DOS attack;
      receiving, from the AUSF, an event report including at least one of an AMF ID and a SUPI ID for the UE which is under the DOS attack, a backoff timer and the exception category associated with the UE performing the DOS attack, from the AUSF;
      receiving, from the AMF, a mapping comprising an indication on which N1 interface a NAS authentication has failed for a corresponding UE; and
      receiving, from the AMF, an event report including at least one of a subscription concealed identifier (SUCI), a TAI, a closed access group identifier (CAG ID), a physical cell ID (PCI), a downlink (DL) frequency, a backoff timer and the exception category associated with the UE performing the DOS attack, and
   wherein a SUPI corresponding to a SUCI of the corresponding UE is checked by the AMF.

5. The method of claim 4,
   wherein the transmitting of the analytics associated with the detection of the attack on the UE to the consumer NF includes:
      transmitting, to the consumer NF, an exception ID indicating a suspicion of the DOS attack, an exception category of failure, UE characteristics, a SUPI list, and a list of UEs classified based on experience level of the DoS attack, and
   wherein a release of resource associated with the UE is performed by the consumer NF based on the analytics provided by the NWDAF.

6. The method of claim 1,
   wherein the requesting of the analytics information includes:
      transmitting_a request to an AMF for information associated with a MitM attack, and
   wherein the request includes at least one of an event identity (ID), an event filter, and an internal-group-identifier.

7. The method of claim 1,
   wherein the receiving of the analytics information from the at least one network entity includes:
      receiving, from an AMF, an event report which includes-including at least one of a SUCI, TAI, CAG ID, PCI, RAN UE ID, backoff timer and an exception category associated with the UE performing MitM attack;
      comparing the actual parameter and the expected parameter which are provided by the AMF; and
      receiving, from an operations, administration and maintenance (OAM), the event report associated with the MitM attack, and
   wherein a TAI broadcasted by a base station and a TAI provided by the UE are checked by the AMF during a registration request of the UE.

8. The method of claim 1,
   wherein the transmitting of the analytics associated with the detection of the attack on the UE to the consumer NF includes:
      transmitting, to the consumer NF, an exception ID corresponding to a suspicion of an MitM attack, an exception category, UE characteristics, a SUPI list, and a list of UEs classified based on experience level of the MitM attack, and
   wherein a release of resource with the UE is performed by the consumer NF based on the analytics provided by the NWDAF.

9. A method performed by a consumer network function (NF) in a wireless communication, the method comprising:
   transmitting, to a network data analytics function (NWDAF), a request for analytics associated with a user equipment (UE); and
   receiving, from the NWDAF, analytics associated with detection of an attack on the UE, wherein the analytics associated with the detection of the attack is derived from comparison of an expected parameter related to the UE and an actual parameter related to the UE,
wherein the comparison is based on at least one tracking area identity (TAI) included in analytics information received from at least one network entity, and
wherein the expected parameter related to the UE includes a TAI collected from a base station and the actual parameter related to the UE includes a TAI collected from the UE.

10. The method of claim 9, further comprising:
receiving, from the NWDAF, the analytics information; and
indicating, to the UE, a recovery mechanism for the attack based on the analytics information received.

11. The method of claim 10, wherein the recovery mechanism includes at least one of:
a release of resources reserved for the UE in a core network;
an indication the UE to move out of one of a current cell, a tracking area and a serving public land mobile network (PLMN);
an indication to the UE to update a UE configuration; or
an indication to the UE for an appropriate backoff timer value.

12. The method of claim 9, further comprising:
detecting a continuous failure of a non-access-stratum (NAS) procedure of the UE with a network;
determining a possibility of the attack on the UE based on the detected continuous failure of the NAS procedure; and
transmitting, to the NWDAF, the request for the analytics associated with the UE based on the determination.

13. The method of claim 12, wherein the NAS procedure includes one of an authentication procedure, a registration procedure, a service request procedure, a packet data unit (PDU) session establishment procedure, or a UE configuration update procedure.

14. A network data analytics function (NWDAF) in a wireless communication system, the NWDAF comprising:
a transceiver; and
at least one processor coupled to the transceiver, wherein the at least one processor is configured to:
receive, from a consumer network function (NF), a request for analytics iassociated with a user equipment (UE),
request the analytics information associated with the UE to at least one network entity,
receive, from the at least one network entity, the analytics information, wherein the received analytics information includes at least one tracking area identity (TAI),
compare an expected parameter of related to the UE with an actual parameter related to the UE based on the at least one TAI included in the analytics information,
derive analytics associated with detection of an attack on the UE from a result of the comparing of the expected parameter of the UE, and
transmit, to the consumer NF, the analytics associated with the detection of the attack on the UE,
wherein the expected parameter related to the UE includes a TAI collected from a base station and the actual parameter related to the UE includes a TAI collected from the UE.

15. The NWDAF of claim 14,
wherein the at least one processor is configured to transmit a request to at least one of a unified data management (UDM), an authentication server function (AUSF) and an access and mobility management function (AMF) for information associated with a DoS attack, and
wherein the request includes at least one of an event identity (ID), an event filter, and an internal-group-identifier.

16. The NWDAF of claim 15,
wherein the at least one processor is configured to:
receive, from the UDM, an event report including at least one of an AUSF ID, a subscription permanent identifier (SUPI) for the UE which is under a DOS attack, a back-off timer and an exception category associated with a UE performing the DOS attack
receive, from the AUSF, an event report including at least one of an authentication management function (AMF) ID and a SUPI ID for the UE which is under the DOS attack, a backoff timer and the exception category associated with a UE performing the DOS attack,
receive, from the AMF, a mapping comprising an indication on which N1 interface a NAS authentication has failed for a corresponding UE, and
receive, from the AME, an event report including at least one of a SUCI, a tracking area identity (TAI), a closed access group identifier (CAG ID), a physical cell ID (PCI), a downlink (DL) frequency, a backoff timer and the exception category associated with the UE performing the DOS attack, and
wherein a SUPI corresponding to a SUCI of the corresponding UE is checked by the AMF.

17. The NWDAF of claim 14,
wherein the at least one processor is configured to transmit a request to at least one of an access and mobility management function (AMF) for information associated with a man in the middle (MitM) attack, and
wherein the request includes at least one of an event identity (ID), an event filter, and an internal-group-identifier.

18. The NWDAF of claim 14,
wherein the at least one processor is configured to:
receive, from an AMF, an event report including at least one of a SUCI, TAI, CAG ID, PCI, RAN UE ID, backoff timer and an exception category associated with a UE performing a MitM attack,
compare the actual parameter and the expected parameter which are provided by the AMF, and
receive, from an operations, administration and maintenance (OAM), the event report associated with the MitM attack, and
wherein a TAI broadcasted by a base station and a TAI provided by the UE are checked by the AMF during a registration request of the UE.

19. A consumer network function (NF) in a wireless communication system, the consumer NF comprising:
a transceiver; and
at least one processor coupled to the transceiver, wherein the at least one processor is configured to:
transmit, to a network data analytics function (NWDAF), a request for analytics associated with a user equipment (UE), and
receive, from the NWDAF, analytics associated with detection of an attack on the UE, wherein the analytics associated with the detection of the attack is derived from comparison of an expected parameter related to the UE and an actual parameter related to the UE, wherein the comparison is based on at least one tracking area identity (TAI) included in analytics information received from a network entity, and wherein the expected parameter related to the UE includes a TAI collected from a base station and the actual parameter related to the UE includes a TAI collected from the UE.

20. The consumer NF of claim 19, wherein the at least one processor is configured to:
  receive, from the NWDAF, the analytics information associated with the UE, and
  indicate, to the UE, a recovery mechanism for the attack based on the analytics information received, wherein the recovery mechanism includes at least one of:
  a release of resources reserved for the UE in a core network,
  an indication the UE to move out of one of a current cell, a tracking area and a serving public land mobile network (PLMN),
  an indication to the UE to update a UE configuration, or
  an indication to the UE for an appropriate backoff timer value.

* * * * *